US012345032B2

(12) United States Patent
Hocaoglu

(10) Patent No.: US 12,345,032 B2
(45) Date of Patent: Jul. 1, 2025

(54) SINK MOUNTING ASSEMBLY, SINK LIGHTING ASSEMBLY, AND METHODS OF INSTALLATION

(71) Applicant: Mehmet Hocaoglu, Coral Springs, FL (US)

(72) Inventor: Mehmet Hocaoglu, Coral Springs, FL (US)

( * ) Notice: Subject to any disclaimer, the term of this patent is extended or adjusted under 35 U.S.C. 154(b) by 0 days.

(21) Appl. No.: 18/373,165

(22) Filed: Sep. 26, 2023

(65) Prior Publication Data

US 2024/0011269 A1 Jan. 11, 2024

Related U.S. Application Data

(63) Continuation of application No. 17/835,094, filed on Jun. 8, 2022, now Pat. No. 11,795,674, which is a continuation of application No. 17/728,249, filed on Apr. 25, 2022, now abandoned.

(60) Provisional application No. 63/178,929, filed on Apr. 23, 2021.

(51) Int. Cl.
*E03C 1/33* (2006.01)
*E03C 1/182* (2006.01)
*F21V 33/00* (2006.01)
*F21Y 115/10* (2016.01)

(52) U.S. Cl.
CPC ................ *E03C 1/33* (2013.01); *E03C 1/182* (2013.01); *F21V 33/004* (2013.01); *F21Y 2115/10* (2016.08)

(58) Field of Classification Search
CPC ..... E03C 1/14; E03C 1/16; E03C 1/18; E03C 1/182; E03C 1/33; E03C 1/335; F21V 33/004; A47B 77/06
USPC ............................ 4/633, 634, 647, 648, 649
See application file for complete search history.

(56) References Cited

U.S. PATENT DOCUMENTS 539,197 A 5/1895 Sherman
2,495,853 A * 1/1950 Lindgren .................. E03C 1/33 292/256.73
3,312,983 A * 4/1967 Jansson ..................... E03C 1/33 312/228
3,358,297 A * 12/1967 Kaempfer ................. E03C 1/33 4/619
4,432,106 A * 2/1984 Smith ..................... E03C 1/335 4/633
6,195,535 B1 2/2001 Kurchuk et al.
6,216,992 B1 4/2001 Bisonaya et al.
7,377,661 B2 5/2008 Douglass
8,277,070 B1 10/2012 Schwarz
9,157,219 B2 10/2015 Gibson

* cited by examiner

*Primary Examiner* — Erin Deery
(74) *Attorney, Agent, or Firm* — Scott D. Smiley; Scott M. Garrett; The Concept Law Group, P.A.

(57) ABSTRACT

A lighted sink includes a sink with a sink lighting assembly coupled to an upper end of the sink. The lighting assembly projects light downward and into the sink, which at the same time, protects the light emitting element from moisture and contaminants through a combination of protective walls that physically house the light emitting element and leave at least one side open to a transparent window that allows light to broadcast to and illuminate an interior of the sink.

21 Claims, 23 Drawing Sheets

SINK MOUNTING ASSEMBLY, SINK LIGHTING ASSEMBLY, AND METHODS OF INSTALLATION

CROSS REFERENCE

This application is a continuation application of U.S. patent application Ser. No. 17/835,094, filed Jun. 8, 2022, which was a continuation of U.S. patent application Ser. No. 17/728,249, filed Apr. 25, 2022, which was a conversion of, and claimed the benefit of provisional application No. 63/178,929, filed Apr. 23, 2021, the entireties of each which are hereby incorporated by reference.

FIELD OF THE INVENTION

The present invention relates generally to sinks, and, more particularly, relates to a sink design that allows the sink to be top mounted, flush mounted, and under mounted without changing the configuration of the sink.

BACKGROUND OF THE INVENTION

Every modern house has a kitchen and every kitchen has sink. Because the kitchen sink is used considerably more than any other part of the kitchen, it is usual located in the center and is a focal point. But kitchen sinks are rarely complimented for their aesthetic beauty. While some high-end countertops and sinks are certainly not unattractive, the sink is not usually the subject of compliments from guests in the home. This is unfortunate, particularly because guests seem to always find their way into the kitchen and it is the kitchen that is often the gathering spot during parties. It is also unfortunate that sinks are not more attractive because modern homes are featuring open kitchen designs, where the sink is not only visible from the kitchen, it is often visible from the front room, dining room, outdoor area, and other places within the home.

There are two standard methods for installing sinks-undermount and top mount. Both installation configurations start with a countertop with a large opening cut therein. For the undermount installation, the sink is sized so that the vertical side walls of the sink are approximately the same size as the hole in the countertop. Liquids and solid particles can be wiped off of the countertop surface directly into the sink. An undermount or recessed sink is installed under a countertop to create a seamless appearance. Undermount sinks can be mounted in two different ways: reveal (showing some of the sink rim) or overhang (shows no sink rim), also referred to as no reveal.

FIG. 35 shows a side profile partial cutaway view of sink with walls that form a permitter less than the hole in the countertop. FIG. 36 shows a second installation with sink walls that form a permitter slightly greater than the hole in the countertop. In both FIGS. 35 and 36 a flange or lip at the top of the vertical sink sidewalls extends outwards and is larger than the opening. Clamping structures attached to the bottom surface of the countertop are used to secure the lip to the underside surface of the countertop. There are a variety of structures that can be used, but the goal is to securely mate the sink to the underside of the countertop. Prior-art clamping mechanisms are shown in FIGS. 36 and 36. From above the countertop, the appearance is a countertop surface with inside edges of its opening that flows down and becomes a sink.

Undermount sinks are compatible with many solid surface countertop materials such as granite, marble and soapstone. It is the remodeler's choice for quartz, solid surface, or natural stone countertop materials because of the clean, uninterrupted feel.

The second standard way to install a kitchen sink is referred to as top mount. Also called self-rimming or drop-in sinks, these sinks are easy to install. They fit easily into a cutout in the countertop that is on top of a cabinet and they are supported by the flanges overlapping the cutout. However, debris can sometimes get caught at the edge where the sink and countertop meet. Ideal for replacement, drop-in sinks can be removed and installed without damaging countertops and are a great option for the DYI-er weekend project.

In this top mount configuration, the vertical walls of the sink form a shape that corresponds to, but is smaller than, the hole in the countertop. The sink includes an outwardly extending lip at its top that is larger than the opening in the countertop. This configuration is easy to install, as one simply sets the sink in the hole in the countertop and the lip and gravity keep it in place. Nevertheless, some form of clamp device is used under the countertop to ensure the sink does not move once it is installed. One such structure is shown in FIG. 37. FIG. 37 also shows how the lip is always visible top of the countertop and is not attractive. The lip is also an impediment to wiping debris from the countertop surface into the sink.

There is also an additional, but rare, method for installing sinks. This method is known as flush mount and is a proprietary method developed by the inventor of the present invention. The flush-mount method secures the sink on the under-side of the countertop when the sink is inserted into the pre-cut sink hole in the countertop. This flush-mount method differs from the aforementioned under-mount configuration due to the sink being secured inside the sink hole with a rimless edge being coplanar with the countertop's upper surface. The result is a beautiful sink that appears to be integrated into the countertop. The flush mount sink has no rim on the edge of the sink, but, as can be seen in the elevational side cutaway view of FIG. 38, a recessed flange welded at a certain height around the sink secures the sink to the underside of the countertop when the sink is inserted into the pre-cut sink hole. Although the sink is mounted to the countertop from underside, it differs from under mount sinks because the sink is secured inside the sink hole with the rimless edge coplanar with the countertop upper surface while an undermount sink rests under the countertop.

Some attempts have been made to improve the look of sinks through the use of light emitting diode (LED) illumination. One such structure is described in European Patent No. EP2194196. In that disclosure, a rectangular LED element is placed between the bottom surface of the countertop and the lip of the undermount sink. This configuration has several disadvantages. First, the undermount sink is lowered by the thickness of the LED element, which can create issues with the bottom of the sink making contact with valves and pipes under the sink and it reduces valuable storage space under the sink. Second, this configuration introduces multiple seams-one between the sink lip and the bottom of the LED structure and another between the LED structure and the bottom surface of the countertop. Each of these seems is a potential portal for water to pass through and fall to the area under the sink, which can eventually rot the cabinet material and/or form mold.

Currently, there is no known sink that allows for versatile installation and provides decorative lighting features.

Therefore, a need exists to overcome the problems with the prior art as discussed above.

SUMMARY OF THE INVENTION

The inventive disclosure provides a sink assembly, and a sink lighting assembly, used for various methods of installation that overcome the hereinabove-mentioned disadvantages of the heretofore-known sink configurations. More particularly, the embodiments provide a novel and unconventional sink assembly that allows the sink to be mounted in a top mount configuration, a flush mount configuration, and a bottom mount configuration, rather that having different sink designs for each of those different mounting configurations. That is, the same basic sink assembly is common to top, flush, and bottom mounting configurations. In the flush and bottom mount configurations, a support frame attached to the underside of the countertop around the sink opening is used to hold the sink in place.

In accordance with some embodiments of the inventive disclosure, there is provided a sink assembly that allows mounting of a sink in each of a top mount, flush mount, and an under-mount configuration at a sink opening of a countertop. The sink assembly includes a sink having at least one wall having a top and an interior surface, an exterior surface, and an upper lip portion formed at the top of the at least one wall which extends outward from the sink. The sink assembly also includes a plurality of brackets coupled to the exterior surface of the at least one wall of the sink. Each bracket of the plurality of brackets is configured to slidably receive and hold a respective bracket/bolt junction member, and each bracket extends outward from the exterior surface of the at least one wall of the sink. The upper lip portion of the sink extends outward farther than each of the brackets of the plurality of brackets. This advantageously allows the sink to be inserted through a sink opening in a countertop; the brackets can pass through the opening while the upper lip portion rests on the top surface of the countertop to hold the sink assembly in place. For flush mount and under mount configurations, the same sink assembly is used further including a support frame that is attached at the underside of the countertop around the sink opening.

In accordance with a further feature, there is further included a top frame having a first wall coupled to the interior surface of the at least one wall of the sink at the top of the at least one wall, a second wall coupled to an upper surface of the upper lip portion, a third wall that extends from a top of the top frame downward to a lower portion that is spaced away from the first wall such that there is a space between the first wall and the lower portion of the third wall, and a fourth wall that that extends upward from an outermost portion of the second to the top of the top frame.

In accordance with a further feature, there is further included a lighting element disposed in the space between the lower portion of the third wall and the first wall.

In accordance with a further feature, the third wall is at an angle that is neither parallel nor perpendicular to either the first wall or the second wall.

In accordance with a further feature, the second wall extends from a top of the first wall, and the third wall is joined to the first wall and the second wall at the top of the first wall.

In accordance with a further feature, each bracket of the plurality of brackets comprises an upper channel along a top of the bracket and a lower channel along a bottom of the bracket.

In accordance with a further feature, the upper and lower channels are U-shaped.

In accordance with a further feature, there is further provided a plurality of bracket/bolt junction members which are each configured to slide into engagement with, and be held by, a respective one of the plurality of brackets. Each of the bracket/bolt junction members has a planar wall which, when the bracket/bolt junction member is engaged and held by its respective bracket, extends outward in a direction away from the sink. The planar wall includes both a non-threaded hole through the planar wall and a threaded hole through the planar wall.

In accordance with a further feature, there is further included an attachment bolt threadably engaged in the threaded hole.

In accordance with a further feature, there is further included a plurality of retaining bolts, each retaining bolt having a head, and a shaft extending from the head. A support frame is configured to be mounted at the underside of the countertop around the sink opening. The frame has a bolt head opening at an underside of the frame that is sized to receive the head of a retaining bolt. The support frame further has a slot extending from the bolt head opening that is narrower than the head of the retaining bolt and wider than the shaft of the retaining bolt. Each of the plurality of retaining bolts are disposed in the slot of the support frame in correspondence with a respective one of the plurality of bracket/bolt junction members, and the shaft of each retaining bolt passes through the unthreaded hole of its respective bracket/bolt junction member. There is also a plurality of retaining nuts, and each one of the plurality of retaining nuts is threadably disposed on the shaft of a respective one of the plurality of retaining bolts under the planar wall of the respective bracket/bolt junction member.

In accordance with some embodiments of the inventive disclosure, there is provided a sink assembly including a sink that allows mounting of the sink at a sink opening of a countertop in each of a top mount, flush mount, and an under-mount configuration. The sink assembly includes the sink having at least one wall having a top, an interior surface, an exterior surface, and an upper lip portion formed at the top of the at least one wall which extends outward from the sink. The sink assembly further includes a plurality of brackets coupled to the exterior surface of the at least one wall of the sink. Each bracket is configured to slidably receive and hold a respective bracket/bolt junction member, and each bracket extends outward from the exterior surface of the at least one wall of the sink. The upper lip portion of the sink extends outward farther than each of the brackets of the plurality of brackets. There is also includes a lighting assembly frame having that has a first wall coupled to the interior surface of the at least one wall of the sink at the top of the at least one wall. The lighting assembly frame also has a second wall coupled to an upper surface of the upper lip portion, a third wall that extends from a top of the top frame downward and has a lower portion that is spaced away from the first wall such that there is a space between the first wall and the lower portion of the third wall, and a fourth wall that that extends upward from an outermost portion of the second to the top of the top frame. There is a lighting element disposed in the space between the lower portion of the third wall and the first wall.

In accordance with a further feature, the third wall is at an angle that is neither parallel nor perpendicular to either the first wall or the second wall.

In accordance with a further feature, the second wall extends from a top of the first wall, and the third wall is joined to the first wall and the second wall at the top of the first wall.

In accordance with a further feature, each bracket of the plurality of brackets comprises an upper channel along a top of the bracket and a lower channel along a bottom of the bracket.

In accordance with a further feature, the upper and lower channels are U-shaped.

In accordance with a further feature, there is further included a plurality of bracket/bolt junction members which are each configured to slide into engagement with, and be held by, a respective one of the plurality of brackets, and each of the bracket/bolt junction members has a planar wall which, when the bracket/bolt junction member is engaged and held by its respective bracket, extends outward in a direction away from the sink. The planar wall includes a non-threaded hole through the planar wall and a threaded hole through the planar wall.

In accordance with a further feature, there is further included a plurality of retaining bolts, each retaining bolt having a head, and a shaft extending from the head. A support frame is configured to be mounted at the underside of the countertop around the sink opening. The frame has a bolt head opening at an underside of the frame that is sized to receive the head of a retaining bolt. The support frame further has a slot extending from the bolt head opening that is narrower than the head of the retaining bolt and wider than the shaft of the retaining bolt. Each of the plurality of retaining bolts are disposed in the slot of the support frame in correspondence with a respective one of the plurality of bracket/bolt junction members, and the shaft of each retaining bolt passes through the unthreaded hole of its respective bracket/bolt junction member. There is also a plurality of retaining nuts, and each one of the plurality of retaining nuts is threadably disposed on the shaft of a respective one of the plurality of retaining bolts under the planar wall of the respective bracket/bolt junction member.

Although the invention is illustrated and described herein as embodied in a sink with light illumination, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms “a” or “an,” as used herein, are defined as one or more than one. The term “plurality,” as used herein, is defined as two or more than two. The term “another,” as used herein, is defined as at least a second or more. The terms “including” and/or “having,” as used herein, are defined as comprising (i.e., open language). The term “coupled,” as used herein, is defined as connected, although not necessarily directly, and not necessarily mechanically. The term “providing” is defined herein in its broadest sense, e.g., bringing/coming into physical existence, making available, and/or supplying to someone or something, in whole or in multiple parts at once or over a period of time.

“In the description of the embodiments of the present invention, unless otherwise specified, azimuth or positional relationships indicated by terms such as “up”, “down”, “left”, “right”, “inside”, “outside”, “front”, “back”, “head”, “tail” and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as “first”, “second”, “third” and so on are only used for descriptive purposes, and cannot be construed as indicating or implying relative importance.

In the description of the embodiments of the present invention, it should be noted that, unless otherwise clearly defined and limited, terms such as “installed”, “coupled”, “connected” should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms “about” or “approximately” apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
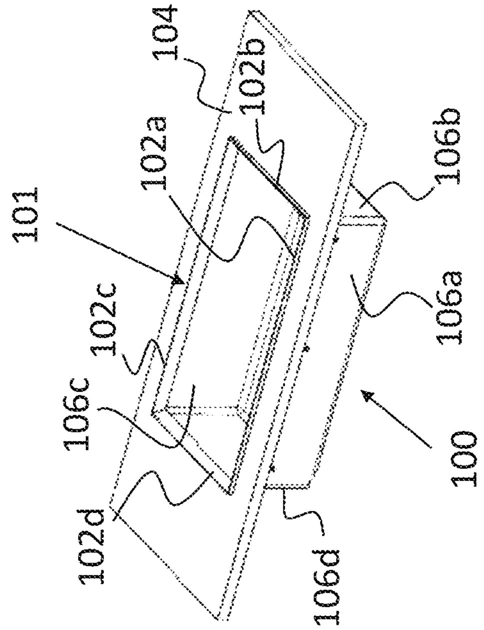
FIG. 1 is a perspective top view of a sink lighting assembly constructed in accordance with the present invention installed within a countertop in a top-mount sink configuration, according to an example embodiment.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides novel and efficient sink installation and lighting hardware assemblies and methods of installation, the assemblies and methods being configured to light a sink interior while simultaneously ensuring secure installation of the sink in multiple positions relative to a countertop. The lighting assembly advantageously prevents debris and other applicable undesirable particles from getting caught in corners and edges where the sink meets with one or more planar surfaces of the countertop in which the sink is installed. The sink mounting and lighting assemblies are configured to support a top-mount sink configuration in which the sink, with brackets on the exterior surface of the sink wall(s), fits easily into a cut-out in the applicable planar surface allowing lips of the sink to overlap the cut-out, an under-mount sink configuration in which the sink is installed below the applicable planar surface, a flush-mount sink configuration in which the sink is secured to the underside of the applicable planar surface via a recessed lip, or a dual-mount sink configuration in which the sink may be installed in the planar surface as a drop-in or an undermount. Furthermore, the present invention not only contributes to the aesthetic appeal of the applicable sink configuration, but also allows versatility to the configuration of the sink based on the preferences of the homeowner. Embodiments of the invention provide a sink mounting assembly including a plurality of walls, a plurality of mounting frames members, each one associated with one of the plurality of walls, a plurality of brackets, and a plurality of retaining and/or affixing mechanisms associated with the plurality of brackets in which the aforementioned components of the sink mounting assembly cooperate to allow for the sink lighting assembly to be installed in any of the aforementioned sink configurations, subject to the particulars of the associated planar countertop surface. Therefore, the sink mounting and lighting assemblies described herein provide improvements to not only the aesthetics of sink configurations, but, in some embodiments, also provides lighting of continuous surfaces allowing debris and other applicable particles to seamlessly be collected in the sink as opposed to getting caught in corners and edges.

Referring now to FIGS. 1-11, a sink lighting assembly 101 is depicted, according to an exemplary embodiment. The figures provided in this disclosure show several advantageous features of the present invention, but, as will be described below, the invention can be provided in several shapes, sizes, combinations of features and components, and varying numbers and functions of the components. FIG. 1 depicts a sink 100 attached to a countertop 104. The sink 100 has a plurality of walls 106*a*-106*n*, where n represents any number larger than one. Some sinks, however are circular and can be considered as having one continuous wall rather than multiple planar walls. The present invention is suitable for applications where the sink has only one wall. As shown in FIG. 1, at the top of the plurality of sink walls 106*a-n* is a top frame that can be a sink lighting assembly 101 that includes a plurality of sink lighting assembly members 102*a-n*, where each sink lighting assembly member 102*a-n* is shown corresponding to one of the plurality of sink walls 106*a-n*. The planar countertop 104 can be any material, such as marble, granite, or any other natural materials, and can also include manufactured materials. The planar countertop 104 has an opening that receives and supports the sink 100.

Figure 2:
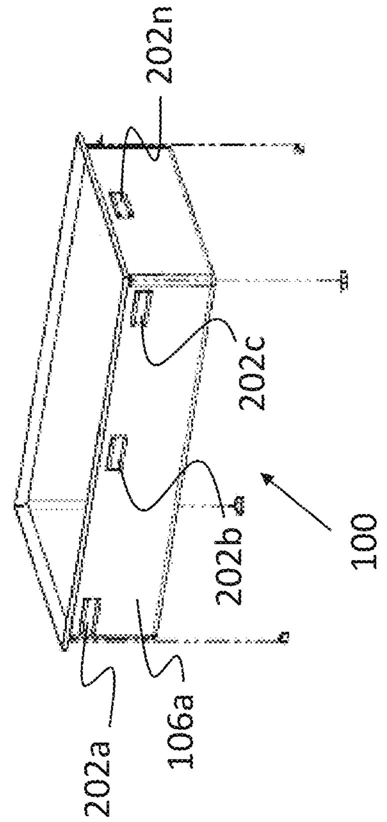
FIG. 2 is a perspective side view of the sink lighting assembly of FIG. 1 removed from the countertop, according to an example embodiment.

Referring now to FIG. 2, a portion of a first sink installation assembly 1001 (shown in FIG. 6) is shown. In this figure, the sink 100 is shown without the countertop 104. A plurality of bracket bases 202*a-n* are shown coupled to the exterior surfaces of the sink walls 106*a-n*. The first sink installation assembly 1001 can include any number of brackets 202 but, preferably, each sink wall 106*a-n* has at least one bracket.

Figure 3:
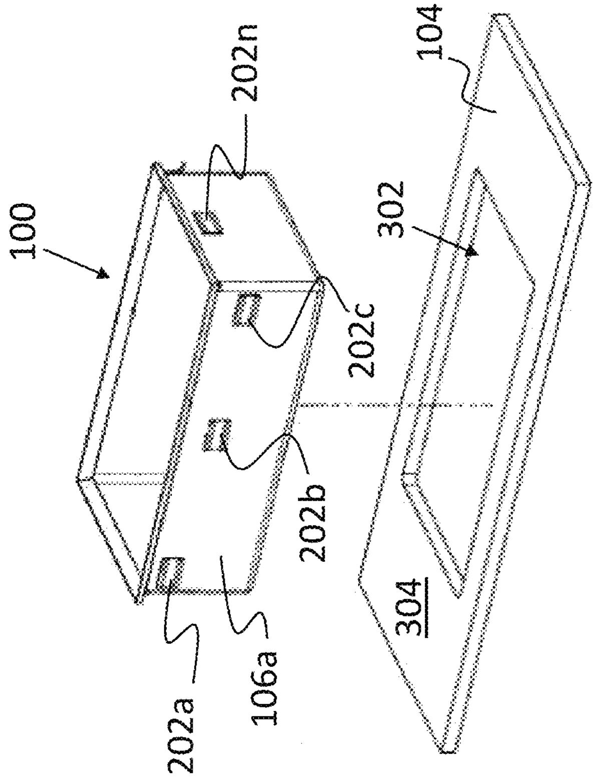
FIG. 3 is a perspective side view of the sink lighting assembly of FIG. 1 removed from the countertop in an unaffixed position, according to an example embodiment.

FIG. 3 shows the sink 100 with brackets 202*a-n* located above an opening 302 in the countertop 104. In this step of the installation process, the sink 100 is to be lowered down into the opening 302. This installation method is called a "top-mount" installation because the dimensions of the upper portions of the sink wall 106 and/or the sink lighting assembly 102 are larger than the opening 302 in the countertop 104.

Figure 4:
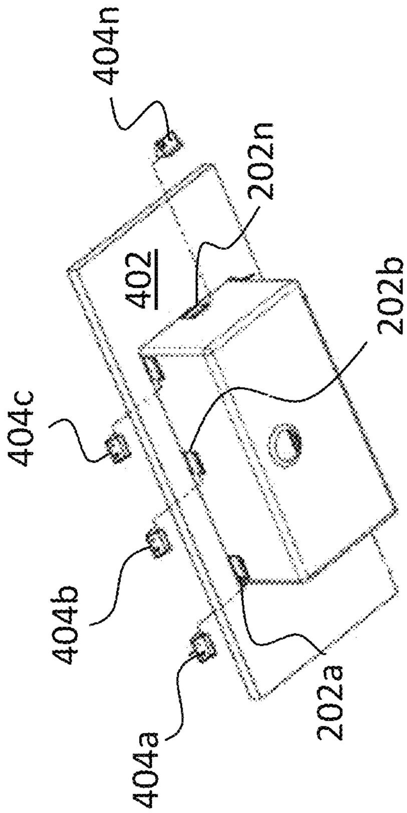
FIG. 4 is a perspective underside view of the sink of FIG. 1 showing a first step of the manner in which the sink is affixed to the countertop, according to an example embodiment.

FIG. 4 shows a view of the underside 402 of the countertop 104. In this view, the lower portion of the sink 100 has been placed inside the opening 302 of the countertop 104. This view shows that the bracket bases 202*a-n* are positioned on the sink walls 106*a-n* of the sink 100 so that they are visible from below the countertop 104 when the sink 100 is fully positioned inside of the opening 302. The phrase "fully positioned" is intended to mean a position where the upper portions of the sink wall 106 and the sink lighting assembly 102 rest on and are fully supported by the upper surface 304 of the countertop 104. FIG. 4 also shows a plurality of bracket/bolt junction members 404*a-n* illustrated as being spaced away and separate from the bracket bases 202*a-n*. Each bracket/bolt junction member 404 corresponds to and slidably engages with one of the brackets 202.

Figure 5:
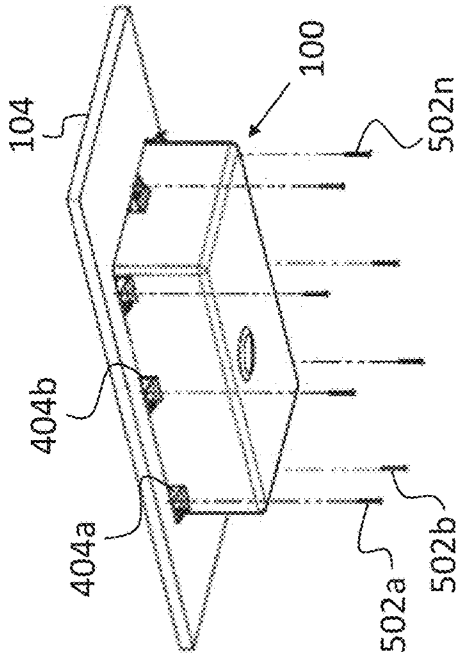
FIG. 5 is a perspective side underside view of the sink of FIG. 1 showing a second step of the manner in which the sink is affixed to the countertop, according to an example embodiment.

FIG. 5 also shows the underside of the sink 100 installed in the countertop 104. This view shows a plurality of attachment bolts 502*a-n* that correspond to the plurality of bracket/bolt junction members 404*a-n*. In one embodiment, each of the bracket/bolt junction members 404*a-n* are provided with a non-illustrated threaded thru-hole that receives corresponding threads of the attachment bolts 502*a-n* in a conventional bolt/thread manner. The threads and threaded thru-holes allow the attachment bolts 502*a-n* to securely attach to the bracket/bolt junction members 404*a-n* and apply pressure to bottom surface of the countertop 104.

Figure 6:
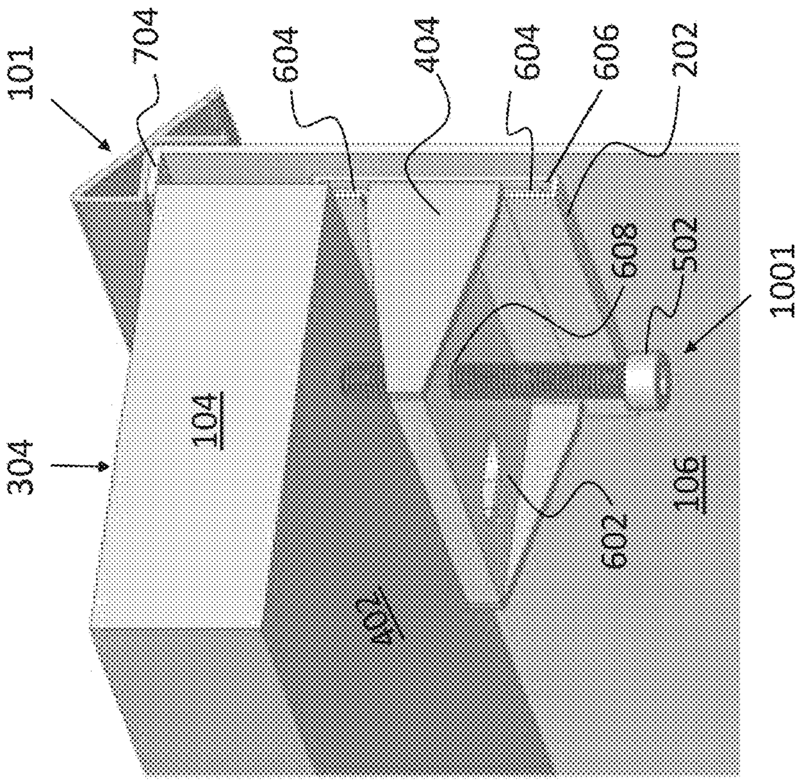
FIG. 6 is a perspective underside sectional view showing a mounting system of the sink lighting assembly affixed to the countertop, according to an example embodiment.

Turning now to FIG. 6, a perspective under-sink view of a portion of the complete sink installation assembly 101 is shown in an upward-looking perspective cutaway view. In this view, the underside 402 of the countertop 104 is depicted and it can be seen that the bracket/bolt junction member 404 is provided with a set of shoulders 604 that slidably engage with channels 606 in the bracket 202. This mechanical engagement secures the bracket/bolt junction member 404 to the bracket 202 in four dimensions. The bracket/bolt junction member 404 can slide out of the channels 606 and away from the bracket 202. Once the bracket/bolt junction member 404 is engaged with the bracket 202 and the sink 100 is in the opening 302 in the countertop 104 and the sink upper lip portion 704 is properly seated against the top surface 304 of the countertop 104, the attachment bolt 502 is inserted through the bracket/bolt junction member 404 at threaded location 608 in the planar bracket wall 602 in order to place pressure against the underside 402 of the countertop 104. With this configuration, the bolt 502 and bracket/bolt junction member 404 secures the sink 100 to the countertop 104 in a secure manner that prevents the sink 100 from moving with reference to the countertop 104. FIG. 6 also shows a side cutaway view of the sink lighting assembly 101 located at an upper lip portion 704 of the sink wall 106.

Figure 7:
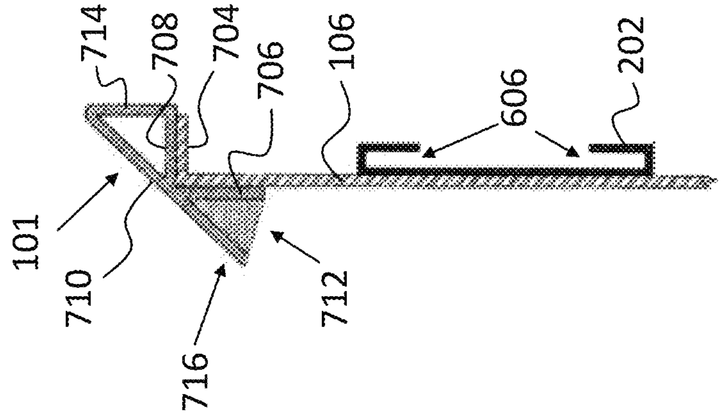
FIG. 7 is an elevational side edge cutaway view of the lighting element and one wall of the sink of FIG. 1 and a bracket base from the mounting system of FIG. 6 and showing a first step of the manner in which the mounting system is affixed to the countertop, according to an example embodiment.

FIG. 7 shows a cutaway elevational view of the sink lighting assembly 101 coupled to an upper lip portion 704 of the sink wall 106. The upper lip portion 704 extends outward at the top of the sink wall(s) relative to the basin defined by the sink wall(s). The top frame of the sink lighting assembly 101 includes a first horizontal wall 706 that is coupled to the sink wall 106 and a second wall 708 that is substantially perpendicular to the first wall 706 and is coupled to the upper lip portion 704 of the sink wall 106. A third wall 710 is coupled to the first wall 706 and the second wall 708 at an angle that is approximately 45°. The present invention is not limited to any particular angle of the third wall 710 with reference to the first wall 706 and second wall 708. In a preferable embodiment, the third wall 710 is neither parallel nor perpendicular to the first wall 706 or the second wall 708. Finally, a fourth wall 714 is coupled to the second wall 708 and the third wall 710. The first wall 706 and third wall 710 create an area 712 that is located between a lower portion 716, i.e., lower half, of the third wall 710 and the first wall 706. As will be explained herein and shown in additional figures, the area 712 houses a novel lighting element that illuminates the interior portion of the sink 100. The upper lip portion 704 extends outward farther than the brackets 202 so that the sink hole in the countertop can be cut to a size that allows the brackets 202 to clear the countertop as the sink is lowered through the hole, but also allow the upper lip portion 704 to rest on the top surface of the countertop.

Figure 8:
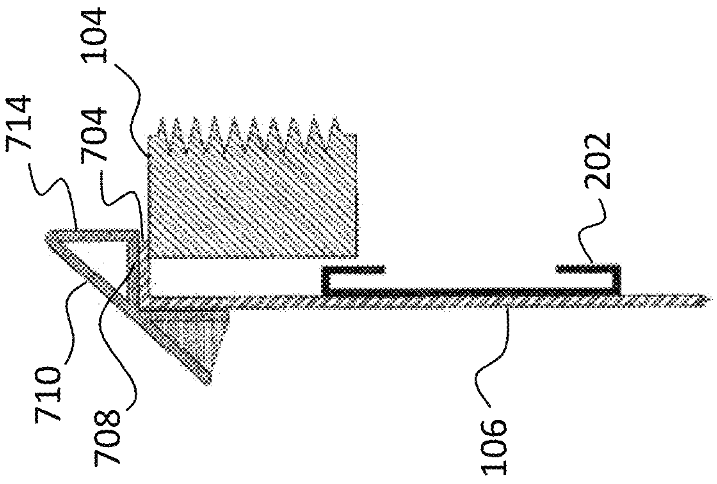
FIG. 8 is an elevational side edge cutaway view of the lighting element, countertop, and one wall of the sink of FIG. 1 and a bracket base from the mounting system of FIG. 6 showing a second step of the manner in which the mounting system is affixed to the countertop, according to an example embodiment.

FIG. 8 is a cutaway elevational side view of the structure of FIG. 7 resting against the countertop 104 in an above-mount configuration. In this configuration, the upper lip portion 704 of the sink wall 106 rests on top of the countertop 104. In addition, the second wall 708, fourth wall 714, and approximately half of the third wall 710 extend above the surface of the countertop 104. FIG. 8 also shows the location of the bracket 202 on the sink wall 106. More specifically, the majority of the bracket 202 is located below the countertop 104 and is accessible for receiving the bracket/bolt junction member 404 (not shown in this figure).

Figure 10:
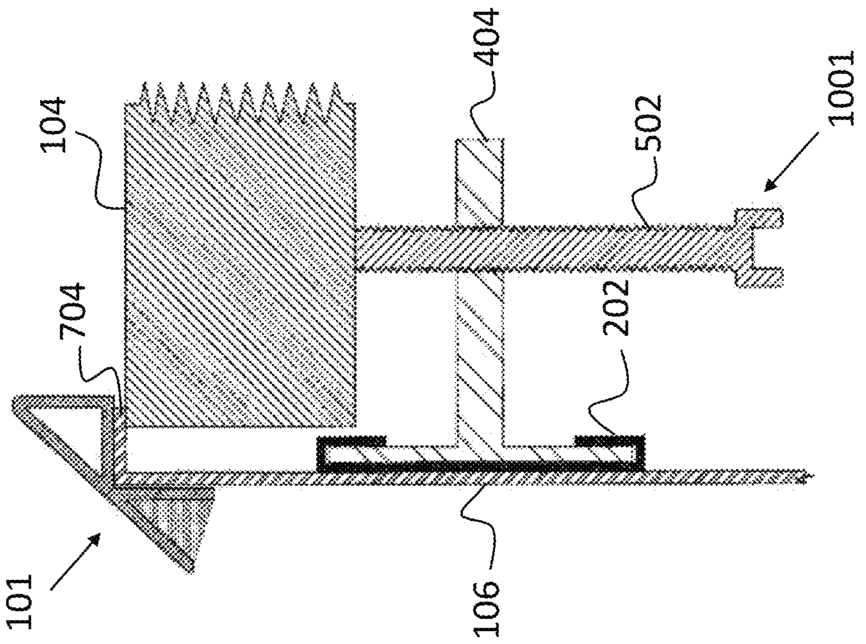
FIG. 10 is a side edge cutaway view of the lighting element, countertop, and one wall of the sink of FIG. 1 and a bracket base, bracket/bolt junction member, and bolt from the mounting system of FIG. 6 showing a fourth step of the manner in which the mounting system is affixed to the counter-top, according to an example embodiment.
Figure 9:
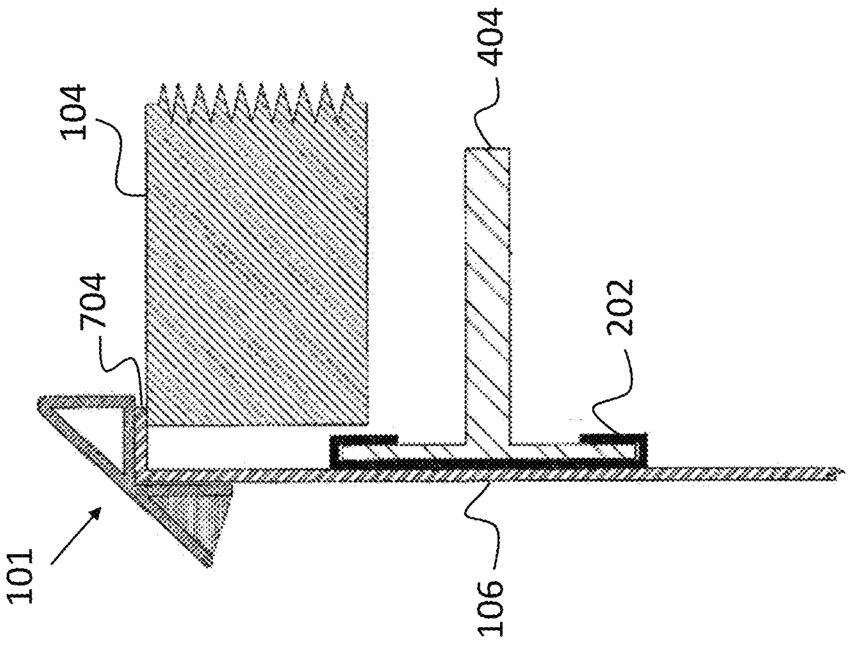
FIG. 9 is a side edge cutaway view of the lighting element, countertop, and one wall of the sink of FIG. 1 and a bracket base and bracket/bolt junction member from the mounting system of FIG. 6 showing a third step of the manner in which the mounting system is affixed to the countertop, according to an example embodiment.

FIG. 9 is an elevational side cutaway view of the structure of FIGS. 7 and 8, but with the bracket/bolt junction member 404 engaged within the bracket 202. FIG. 10 shows that bolt member 502 passes through the bracket/bolt junction member 404 and applies pressure to an underside surface of the countertop 104. The tension of the bolt 502 maintains a constant contact between the upper lip portion 704 of the sink wall 106 and the upper surface of the countertop 104. This prevents movement of the sink 100 once it is installed within the countertop 104.

Figure 11:
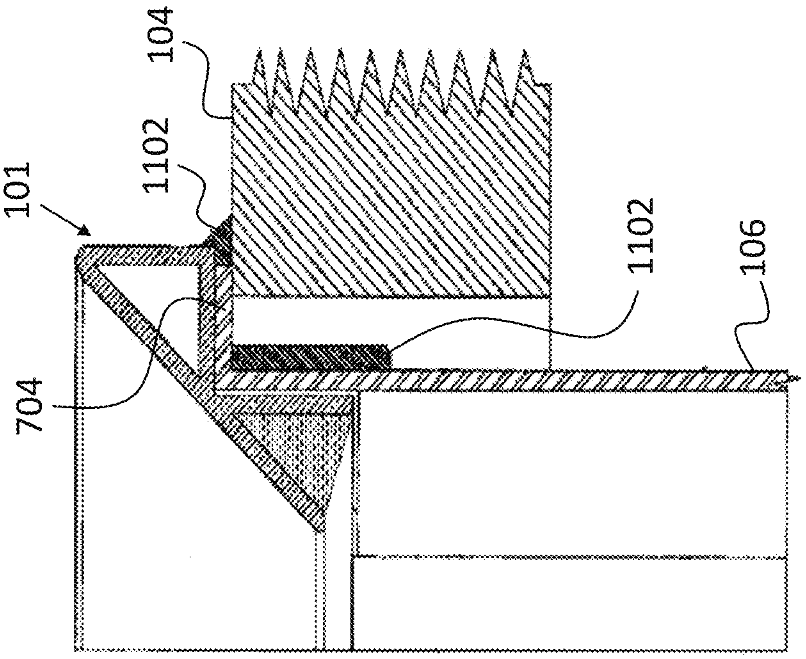
FIG. 11 is a side edge cutaway view of the lighting element, countertop, and one wall of the sink of FIG. 1 affixed to the countertop in a top-mount installation configuration, according to an example embodiment.

In a final step, as shown in FIG. 11, a sealant 1102 is placed between the countertop and the upper wall lip 704 of the sink wall 106. Additionally, the sealant 1102 is also placed between an upper portion of the sink wall 106 and the opening in the countertop 104. The sealant prevents intrusion of water and other materials into the sink/countertop junction. The sealant 1102 can be silicone, caulk, grout, or any other material that is capable of preventing water intrusion.

Figure 12:
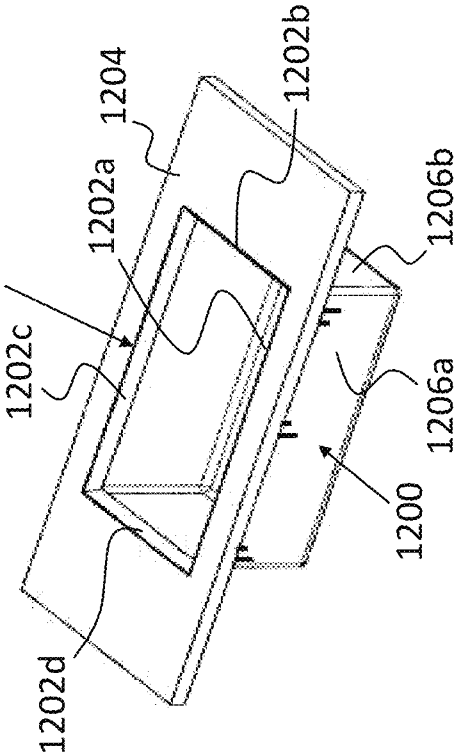
FIG. 12 is a perspective top view of a sink lighting assembly constructed in accordance with the present invention installed within a countertop in a flush-mount sink configuration, according to an example embodiment.

FIG. 12 is a perspective downward-looking view of a sink 1200 installed into a countertop 1204 in a flush-mount configuration. This mounting configuration varies from that shown in FIG. 1 in that there is no portion of the sink in a flush-mount configuration that rests on the upper surface of the countertop 1204. The sink 1200 includes a plurality of sink walls 1206*a-n* and a sink lighting assembly 1201 that includes a plurality of sink lighting assembly members 1202*a-n*, each corresponding to one of the sink walls 1206*a-n*. The term "flush-mount," as used herein, is intended to indicate an installation configuration where the uppermost portion of the sink 1200 does not extend beyond the upper surface of the countertop 1204 in an appreciable way, i.e., it appears to the naked eye that the upper edge of the sink is flush with the countertop. In accordance with the present invention, the sink lighting assembly 1202 is attached to an upper portion of the sink walls 1206 and is the uppermost portion of the sink 1200 in FIG. 12.

Figure 13:
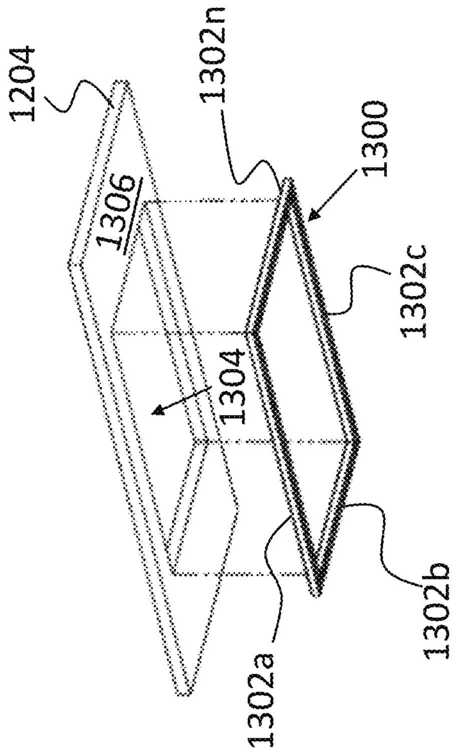
FIG. 13 is a perspective underside view of a support frame aligned with a sink opening in the countertop of FIG. 12, according to an example embodiment.

Referring now to FIG. 13, an underside 1306 of the countertop 1204 is depicted in a perspective upward-looking view. In this view, a frame 1300 that includes a plurality of frame members 1302*a-n* ("a" indicating 1 and "n" indicating any number greater than 1) is shown aligned with an opening 1304 in the countertop 1204. The frame 1300 is dimensioned so as to be larger than the opening 1304. The frame 1300 is intended to be mechanically coupled to the underside 1306 of the countertop 1204. The coupling can be with bolts, adhesive, or any other way to fixedly couple one mechanical element to another. The term "members" when used herein in connection with the frame 1300 does not require separate pieces. Instead, the frame 1300 can be one continuous frame and, in that case, the frame members 1302*a-n* would refer to and be used to reference sides of the continuous frame 1300.

Figure 14:
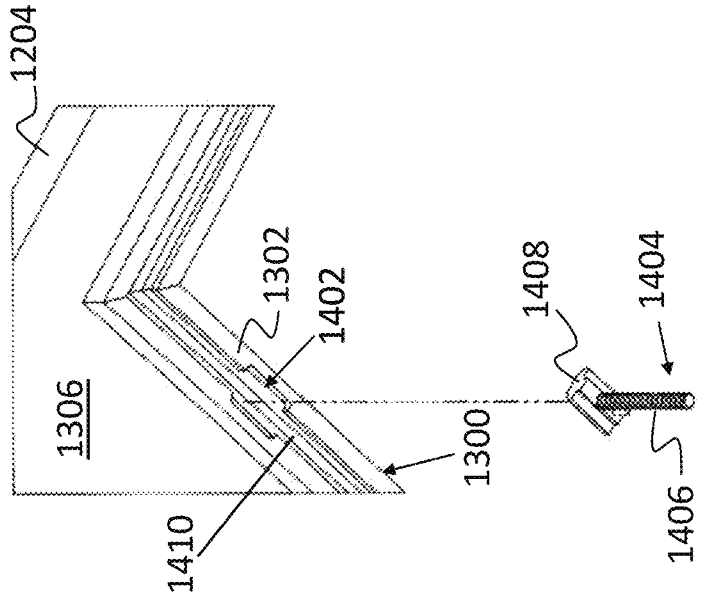
FIG. 14 is a perspective underside partial view of the support frame of FIG. 14 with a U-shaped channel adapted to retain an end of a support bolt therein, according to an example embodiment.

FIG. 14 shows a partial underside view of the frame 1300, which is now coupled to the underside 1306 of the countertop 1204. Each frame member 1302 is provided with a bolt head opening 1402 that is sized and dimensioned to receive a head 1408 of a retaining bolt 1404. Each bolt 1404 is provided with a set of threads 1406. Once the head 1408 of the bolt 1404 is inserted within the opening 1402 of the frame member 1302*a-n*, the bolt 1404 is able to slide in a slot 1410 extending from the bolt head opening 1402. This slidable ability of the bolt 1404 advantageously allows for adjustment and alignment of the bolts 1404 with the bracket assemblies of the sinks. The slot is narrower than the head of the bolt 1408, but wider than the shaft 1406 of the bolt 1404

Figure 15:
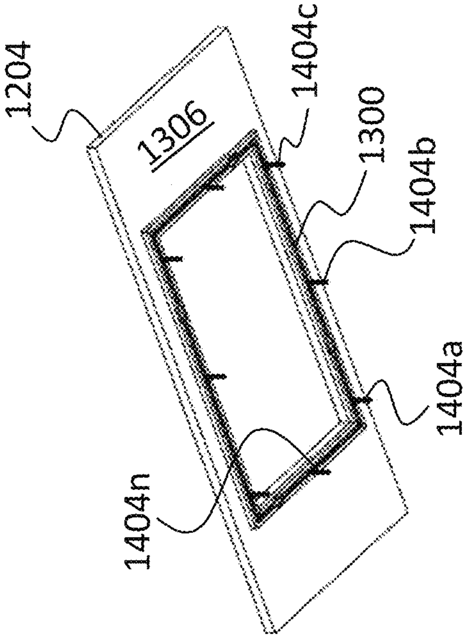
FIG. 15 is a perspective underside view showing the support frame of FIG. 14 with a plurality of bolts retained within the U-shaped channel of FIG. 14, according to an example embodiment.

FIG. 15 is an upward-looking perspective view of the underside 1306 of the countertop 1204 showing the frame 1300 attached to the underside 1306 of the countertop 1204. In this view, a plurality of bolts 1404*a-n* have been inserted and received within the opening 1402 of the frame members 1302*a-n* of the frame 1300. The bolts 1404*a-n* are preferably aligned with the location of the brackets that are attached to the outside of the sink (not shown in this view) that will be coupled to the frame 1300.

Figure 16:
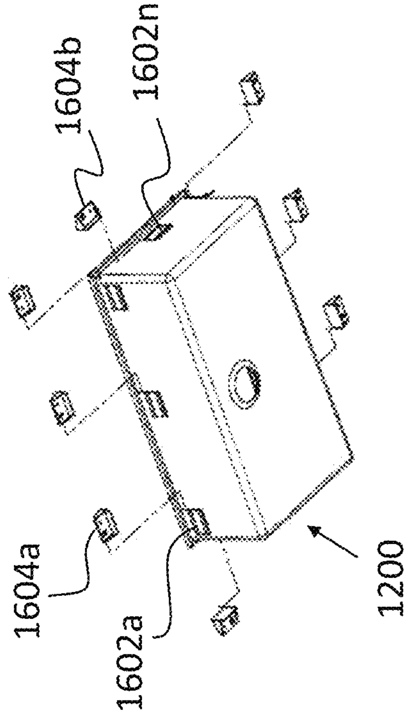
FIG. 16 is a perspective underside view of the sink and lighting element of FIG. 12 and a plurality of bracket bases and bracket/bolt junction members, which are used in a second step of attaching the sink lighting assembly of FIG. 12 to the countertop, according to an example embodiment.
Figure 17:
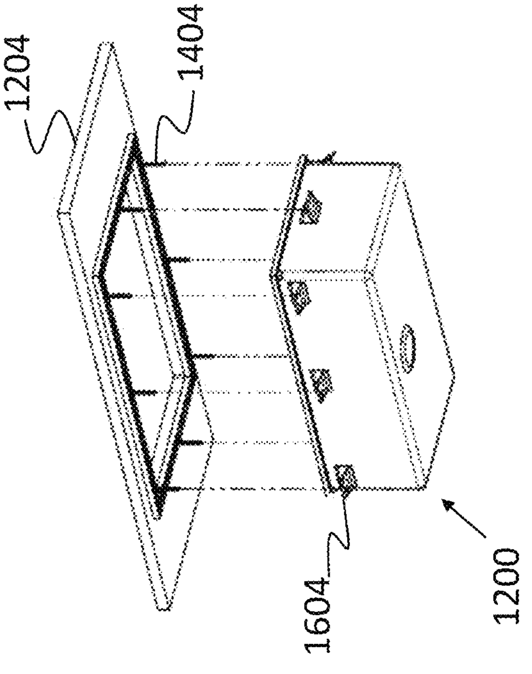
FIG. 17 is a perspective underside view showing the sink and brackets of FIG. 16 being attached to the frame of FIG. 15 in a third step of attaching the sink lighting assembly of FIG. 12 to the countertop, according to an example embodiment.
Figure 18:
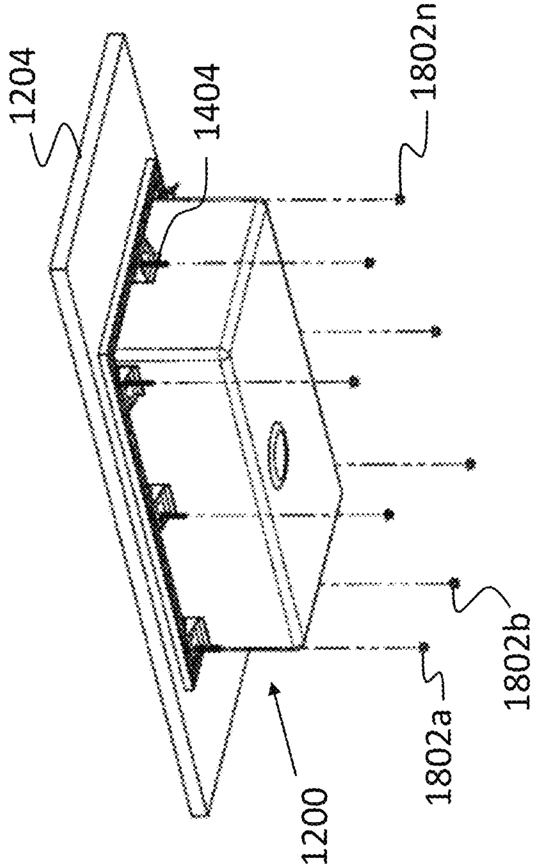
FIG. 18 is a perspective underside view showing the sink and brackets of FIG. 16 being attached to the frame of FIG. 15 with bolts applying an upward force to the sink and lighting element in a fourth step of attaching the sink lighting assembly of FIG. 12 to the countertop, according to an example embodiment.

FIG. 16 shows an underside of sink 1200 with a plurality of brackets 1602*a-n* and corresponding bracket/bolt members 1604*a-n*, similar to that depicted in FIG. 4. FIG. 17 illustrates a preferred alignment between each of the bolts 1404*a-n* and bracket/bolt members 1604*a-n*. In FIG. 18, a plurality of nuts 1802*a-n* are shown aligned with the plurality of bolts 1404 *a-n*. The combination of the nuts 1802*a-n* and bolts 1404*a-n* allow for the sink 1200 to be moved in an upward direction, that is, tightening the nuts 1802*a-n* on the bolts 1404*a-n* applies upward pressure to the entire sink assembly and moves it in an upward direction with respect to the countertop 1204.

Figure 19:
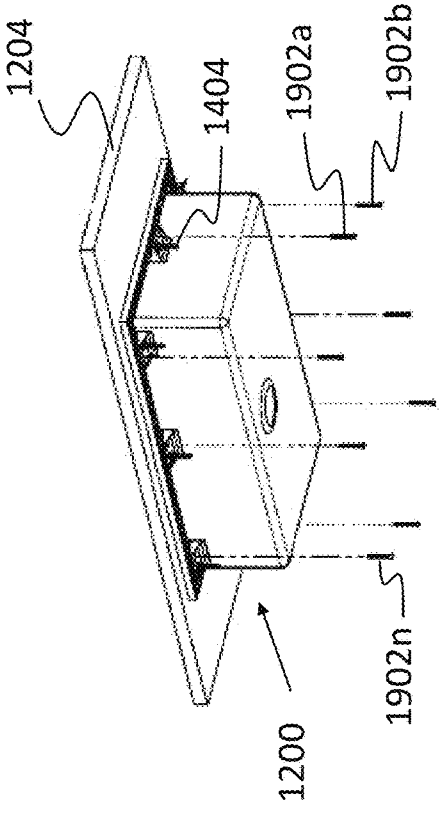
FIG. 19 is a perspective underside view showing the sink and brackets of FIG. 16 being attached to the frame of FIG. 15 with bolts applying a downward force to the sink and lighting element in a fifth step of attaching the sink lighting assembly of FIG. 12 to the countertop, according to an example embodiment.

FIG. 19 shows a plurality of bolts 1902*a-n* that are analogous to the bolts 502*a-n* shown in FIG. 5. The bolts 1902*a-n* apply pressure to the sink 1200 in the opposite direction as do bolts 1404 and nuts 1802. That is, the bolts 1902, when tightened, apply pressure to the sink assembly in a downward direction, i.e., away from the countertop 1204.

Figure 20:
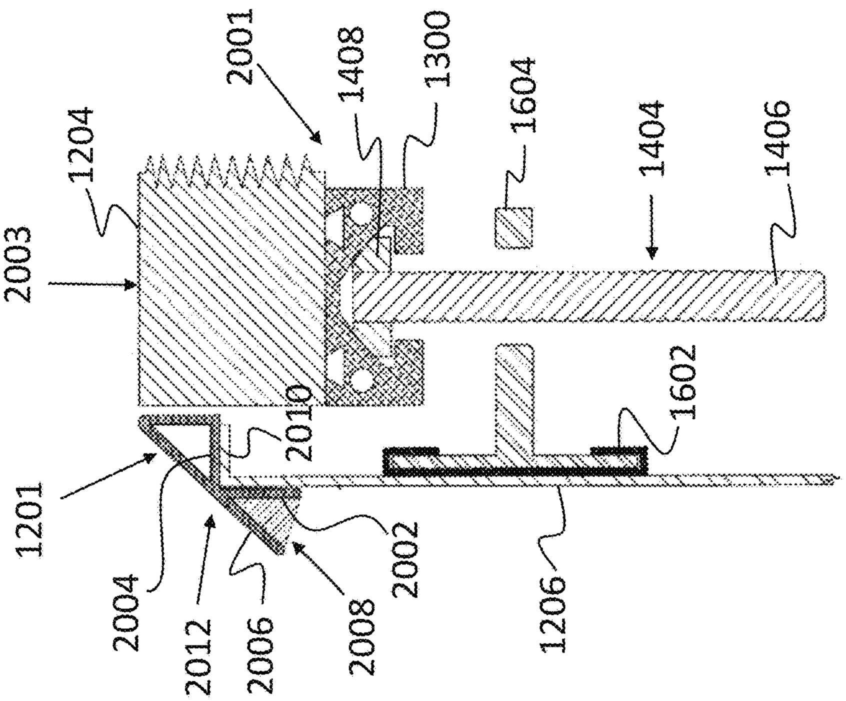
FIG. 20 is a cutaway side view showing the lighting element, countertop, and one wall of the sink of FIG. 12 and a bracket base, bracket/bolt junction member, and bolt from FIG. 18 in a first step of a manner in which the mounting system of FIG. 14 attaches the sink lighting assembly to the countertop in a flush-mount configuration, according to an example embodiment.

FIG. 20 provides an elevational cutaway view of the sink mounting assembly 2001 installed in a countertop 1204 in a flush-mount configuration. The sink mounting assembly 2001 includes the frame 1300, the bracket 1602, the bracket/bolt junction 1604, the bolt 1404, and a second bolt 2202 (shown only in FIG. 22). Here, the uppermost portion of the lighting assembly 1201 is even with an upper surface 2003 of the countertop 1204. The lighting assembly 1201 includes a first wall 2002, a second wall 2004, and a third wall 2006. Like the embodiment shown in FIG. 7, the first wall 2002 is parallel to and coupled to the sink wall 1206. The second wall 2004 is parallel to and coupled to an upper lip 2010 of the sink wall 1206. The first wall 2002 and the second wall 2004 are substantially perpendicular to one another. A third wall 2006 is coupled to the first wall 2002 and the second wall 2004 at an angle that is neither perpendicular nor parallel to the first wall 2002 and second wall 2004. A lower portion 2012 of the third wall 2006 and the first wall 2002 create an area 2008 that holds a light emitting element (LED) (not shown in this view).

Figure 21:
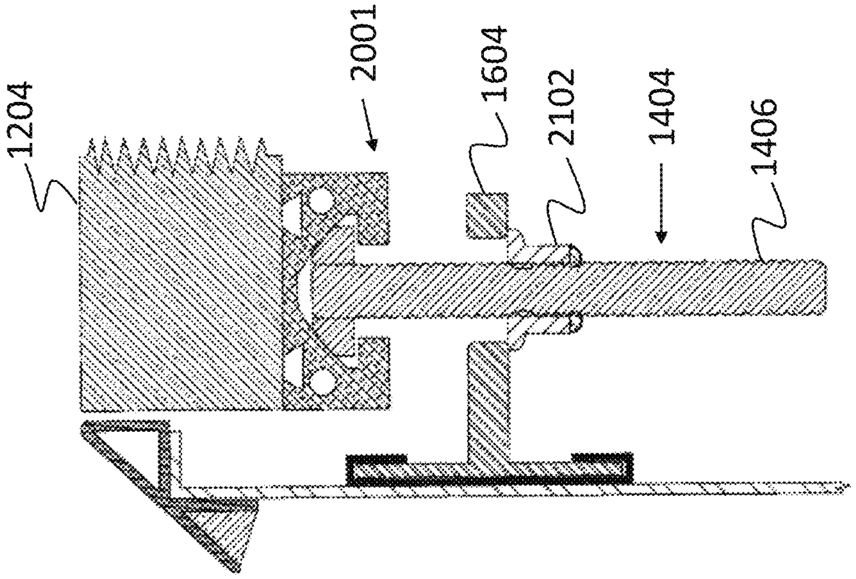
FIG. 21 is a cutaway side view showing the lighting element, countertop, and one wall of the sink of FIG. 12 and a bracket base, bracket/bolt junction member, and bolt from FIG. 18 with a nut installed in a second step of the manner in which the mounting system of FIG. 14 attaches the sink lighting assembly to the countertop in a flush-mount configuration, according to an example embodiment.

FIG. 21 provides an elevational cutaway view of the sink mounting assembly 2001 and countertop 1204 and shows bolt 1404 passing through the bracket/bolt junction member 1604. Nut 2102 is coupled to the bolt 1404 and, by pressing against the bracket/bolt member 1604, applies upward pressure to the sink assembly.

Figure 22:
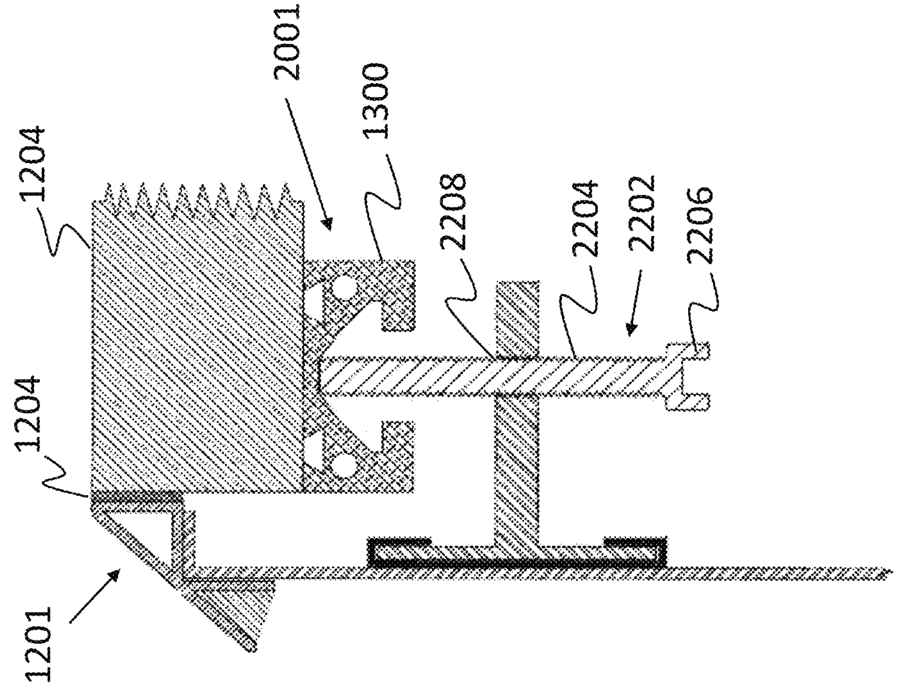
FIG. 22 is a cutaway side view showing the lighting element, countertop, and one wall of the sink of FIG. 12 and a bracket base, bracket/bolt junction member from FIG. 18 with a second bolt in a third step of the manner in which the mounting system of FIG. 14 attaches the sink lighting assembly to the countertop in a flush-mount configuration, according to an example embodiment.
Figure 23:
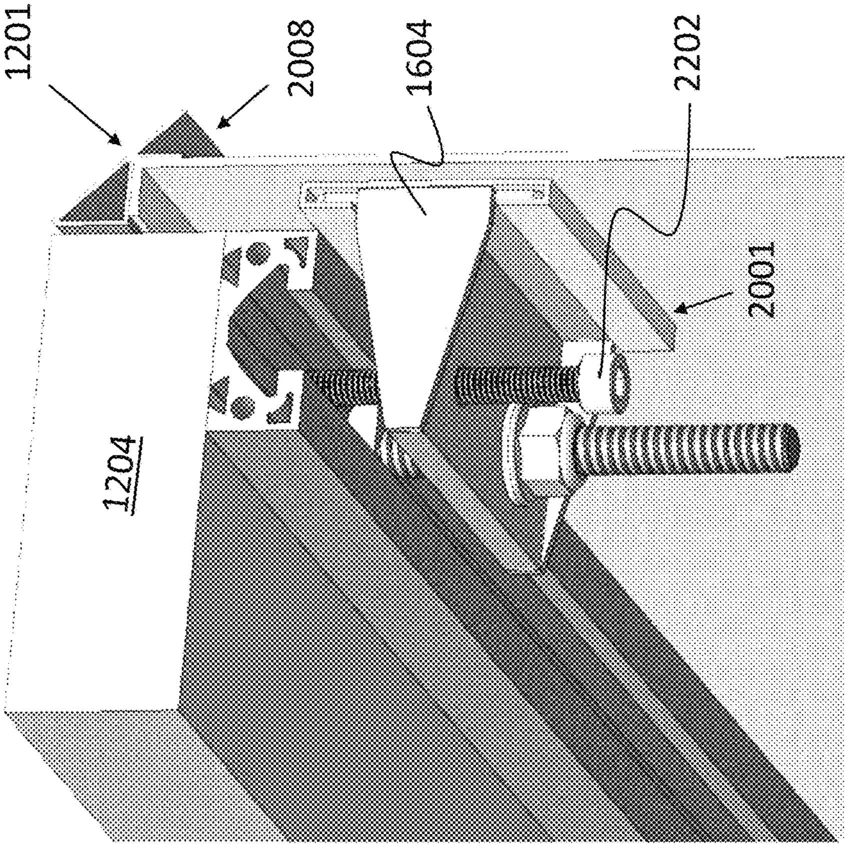
FIG. 23 is a perspective underside sectional view of the sink lighting assembly of FIGS. 17-22 affixed to the countertop, according to an example embodiment.

FIG. 22 is an elevational cutaway view of the sink mounting assembly 2001 shown in FIG. 21, but shows an offsetting bolt 2202 threadingly coupled to the bracket/bolt member 1604 at a coupling point 2208. Threads 2204 mate with corresponding threads within the bracket/bolt member 1604 at the coupling point 2208. By turning head 2206 of offsetting bolt 2202, pressure is applied against the frame 1300, which is attached to a bottom surface of the countertop 1204. The combination of the upward pressure provided by the bolt 1404 and the downward pressure of the bolt 2202 locks the sink assembly into a fixed position that resists forces, whether upward or downward, and maintains the sink in a fixed and secure position with reference to the countertop 1204. These offsetting bolts are show in FIG. 23, which is an upward-looking cutaway view of the underside of the countertop 1204 and shows both bolt 1404 and offsetting bolt 2202. The lighting assembly 1202 is shown secured and flush with the countertop 1204.

Figure 24:
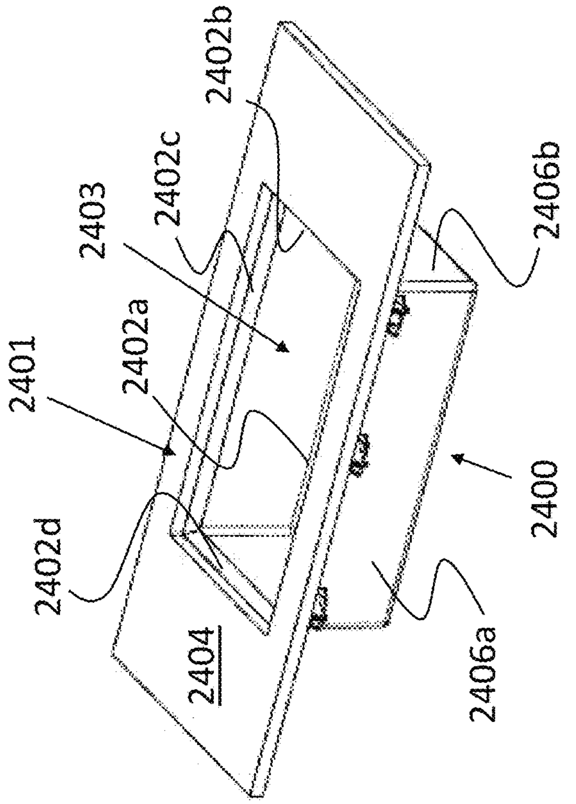
FIG. 24 is a first perspective top view of a sink lighting assembly constructed in accordance with the present invention installed within a countertop in an undermount sink configuration, according to an example embodiment.

FIG. 24 is a downward-looking perspective view of a third mounting configuration of the present invention. This mounting configuration is referred to herein as "undermount." This embodiment includes a sink 2400 with a light-emitting assembly 2401 attached at an upper end thereof. The light-emitting assembly 2401 includes a plurality of light-emitting assembly members 2402*a-n*. The sink 2400 includes a plurality of sink walls 2406*a-n*. In one embodiment, each of the plurality of light-emitting assembly members 2402*a-n* corresponds to one of the plurality of sink walls 2406*a-n*. The sink 2400 and light-emitting assembly 2401 are visible through an opening 2403 in the countertop 2404.

Figure 25:
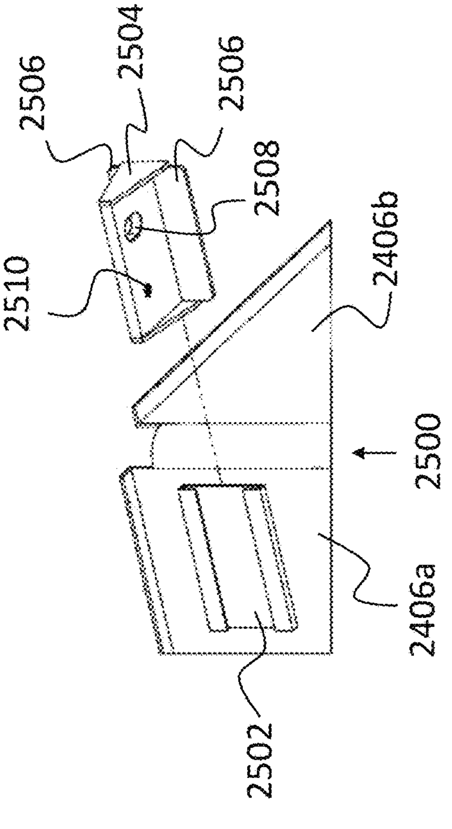
FIG. 25 is a side bottom view showing a first step of the manner in which the sink lighting assembly of FIG. 24 is affixed to the countertop, according to an example embodiment.

FIG. 25 shows a partial view of the sink 2400 of FIG. 24. In this view, a first wall 2406*a* and the second wall 2406*b* can be seen meeting each other at a corner 2500. The bracket 2502 is attached to sink wall 2406*a*. A bracket/bolt junction member 2504 is illustrated in an adjacent position to the bracket 2502. The bracket/bolt junction member 2504 has a pair of feet 2506 that correspond to and slidably engage with channels within the bracket 2502. The bracket/bolt junction member 2504 includes a through hole 2508 and a threaded hole 2510. The through hole 2508 is for a bolt that applies upward pressure to the bracket/bolt junction member 2504, as described in connection with FIG. 23. The threaded hole 2510 is for a bolt that applies downward pressure to the bracket/bolt junction member 2504, as described in connection with FIG. 23.

Figure 26:
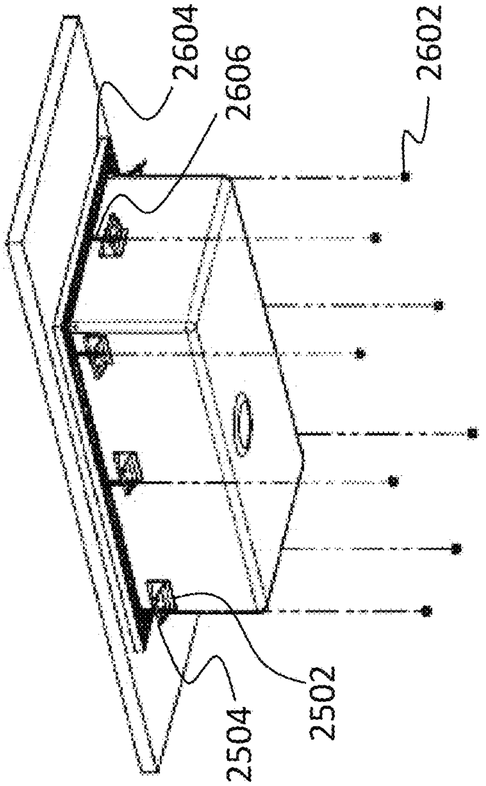
FIG. 26 is a side bottom view showing a second step of the manner in which the sink lighting assembly of FIG. 24 is affixed to the countertop, according to an example embodiment.

FIG. 26 is similar to FIG. 19 and shows an alignment between brackets 2502, bracket/bolt junction members 2504, bolts 2606, a frame member 2604, and a plurality of nuts 2602.

Figure 27:
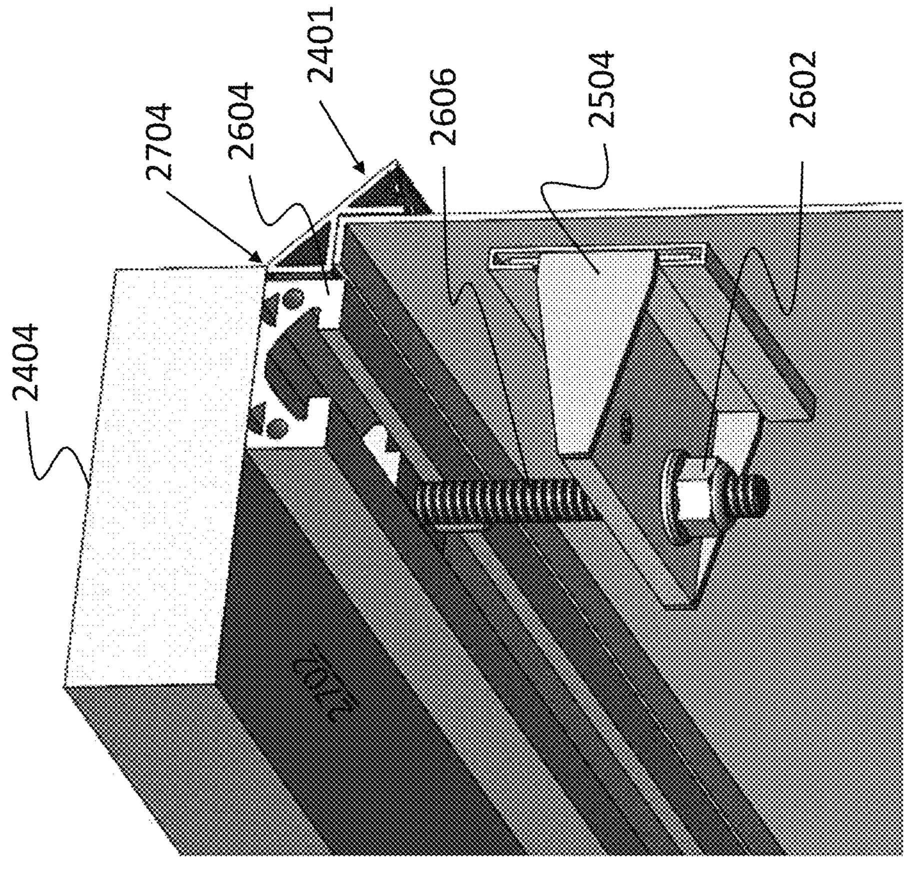
FIG. 27 is a side sectional view of a mounting system of the sink lighting assembly of FIG. 24 affixed to the countertop, according to an example embodiment.

FIG. 27 is an upward-looking view of the bottom surface 2702 of the countertop 2404. FIG. 27 illustrates the fact that the uppermost point 2704 of the light-emitting assembly 2401 touches the bottom surface 2702 of the countertop 2404 in this under mount configuration.

Figure 28:
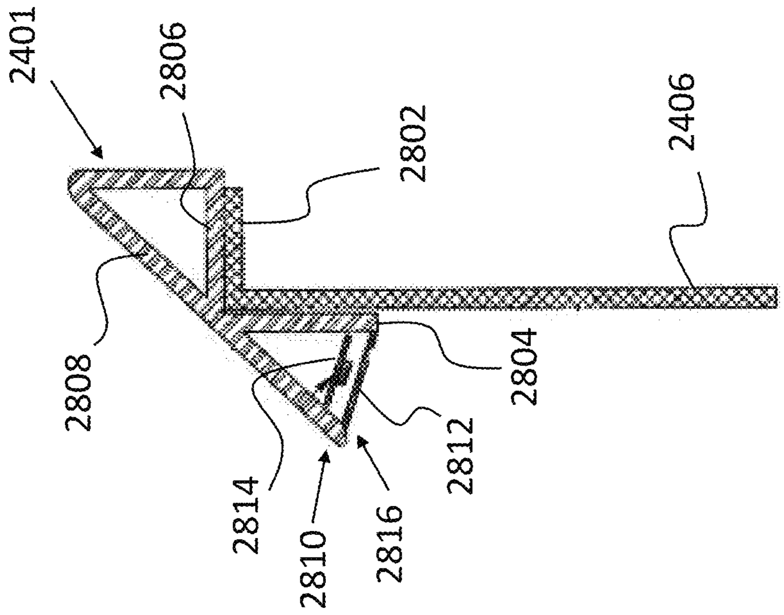
FIG. 28 is a side cutaway view of the lighting element and wall of the sink of FIG. 1 showing a lighting strip inside and covered by a protective layer of the lighting element, according to an example embodiment.

FIG. 28 provides an elevational side view of a light-emitting assembly 2401, in accordance with an embodiment of the present invention. The light-emitting assembly 2401 includes a first wall 2804, a second wall 2806, and a third wall 2808. In this view, a light element 2814 is shown disposed within a space 2816 between a lower portion 2810 of the third wall 2808 and the first wall 2804. The third wall 2808 extends from the top of the lighting assembly 2401 downward such that the bottom of the lower portion 2810 is positioned away from the bottom of the first wall. The third wall 2808 can also be joined to the first wall 2804 and the second wall 2806 where the first wall 2804 and the third wall 2806 meet. The light element 2814, in one embodiment, is a linear strip light emitting diode array that provides substantially consistent illumination along a linear dimension. Because the present invention is a sink that is constantly exposed to water and contaminants, in one embodiment of the present invention, a protective element 2812 is disposed between the lower portion 2810 of the third wall 2808 and the first wall 2804 of the light-emitting assembly 2401 and seals the light element 2814 from the environment. The protective element 2812 can be any material that provides a waterproof barrier and should be one that allows light to pass from one side of the material to the other.

Figure 30:
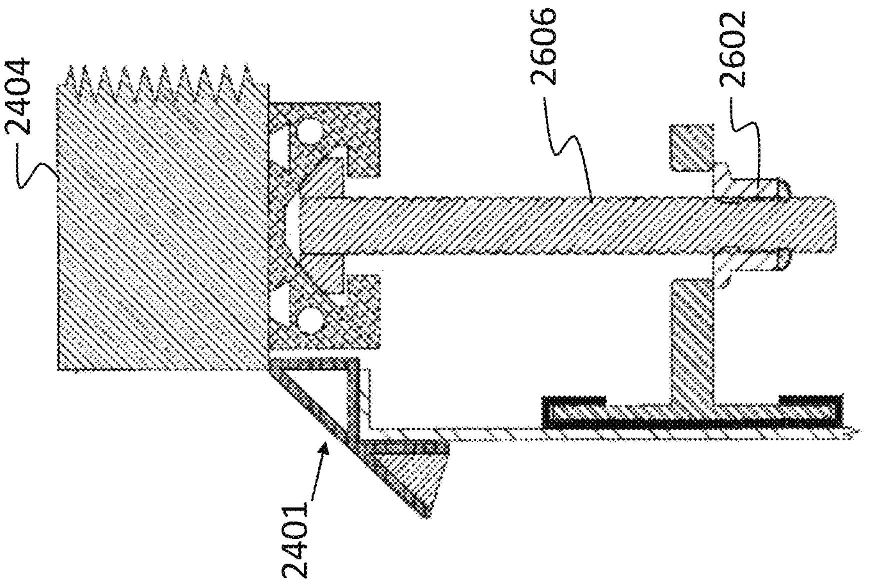
FIG. 30 is a side view of the lighting element of FIG. 28 installed in an undermount configuration, according to an example embodiment.
Figure 29:
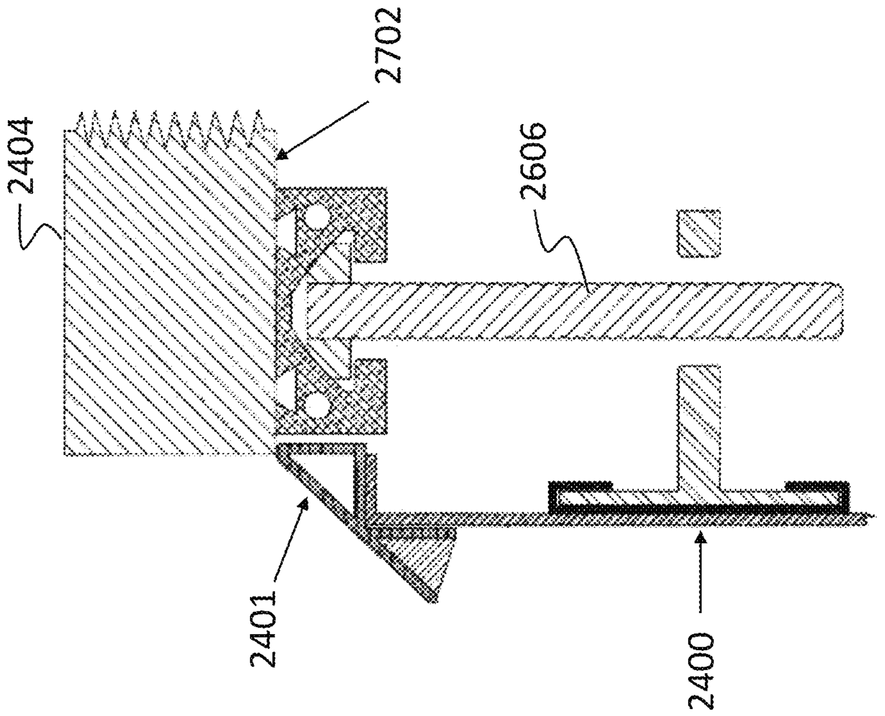
FIG. 29 is a side cutaway view of the lighting element of FIG. 28 installed in an undermount configuration, according to an example embodiment.

FIGS. 29 and 30 provide elevational partial cutaway views of the sink 2400 and lighting assembly 2401 mounted under the countertop 2404 in an undermount configuration. In these views, it can be seen that the uppermost portion of the light-emitting assembly 2401 remains below the lower surface 2702 of the countertop 2404. In this embodiment, the dimensions of the frame 2604 are larger than the opening 2403 in the countertop 2404.

Figure 32:
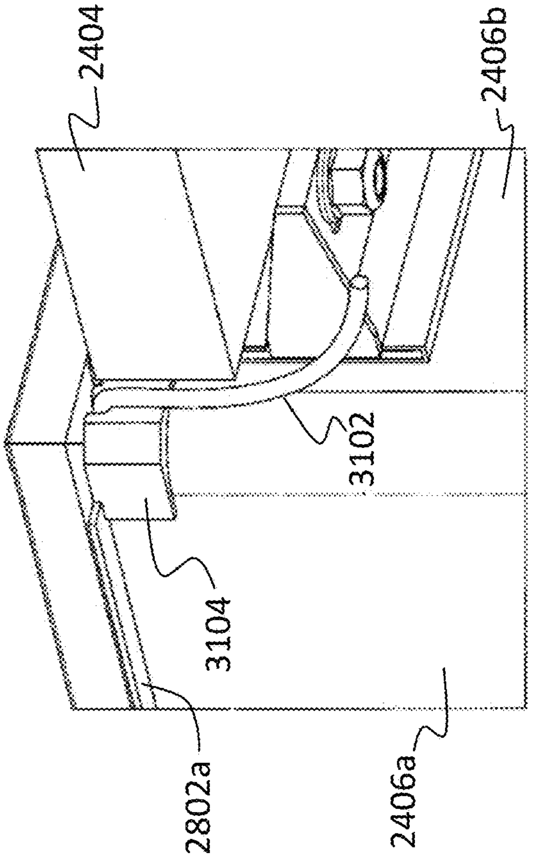
FIG. 32 is an elevational side view of the power source component of FIG. 30 attached to the counter-top, according to an example embodiment.
Figure 31:
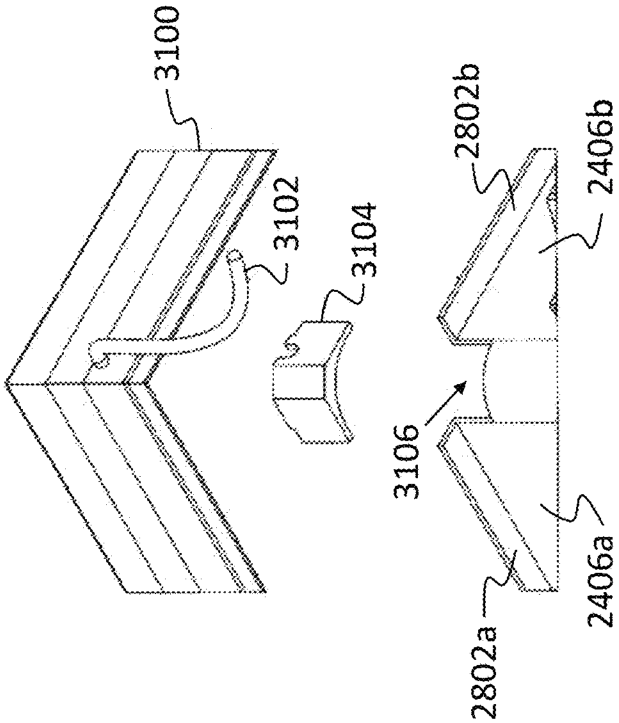
FIG. 31 is an elevational underside view showing a power source component of the sink lighting assembly attached to the lighting element, according to an example embodiment.

FIG. 31 shows a perspective upward-looking exploded partial view of an outside surface of the light-emitting assembly 2401. The view shows two of the sink walls 2406*a* and 2406*b* with corresponding sink lips 2802*a* and 2802*b*. The lips 2802*a* and 2802*b* define an opening 3106 between them. The present invention provides a corner element 3104 that fits within the opening 3106 and secures a power cord 3102 of the light-emitting assembly 2402. The power cord 3102 provides power to the light element 2814 shown in FIG. 28, and runs to the nearest power source. The assembled configuration is shown in FIG. 32, where the light-emitting assembly 2401 is attached to a countertop 2404 and the power cord 3102 runs through the corner element 3104 and under the countertop 2404.

Figure 33:
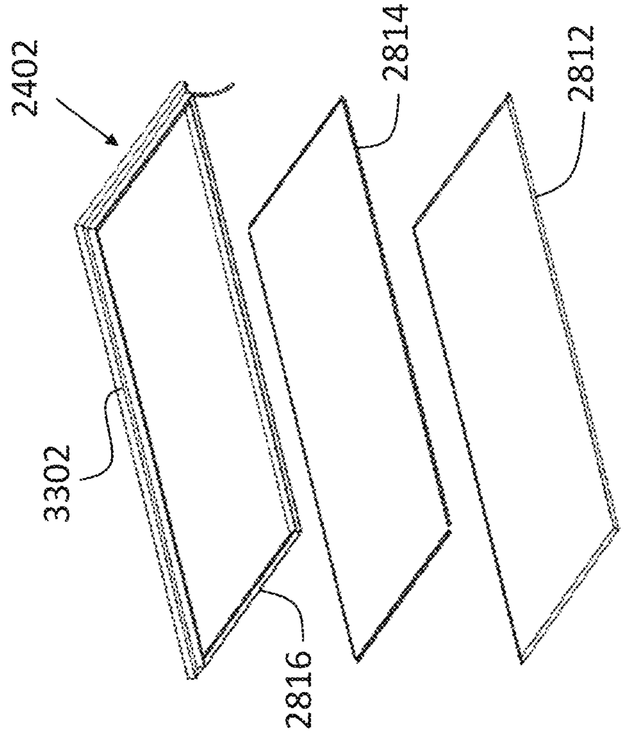
FIG. 33 is a prospective exploded view of the sink lighting assembly, according to an example embodiment.

FIG. 33 shows an exploded view of the light-emitting assembly 2402. The assembly includes a frame structure 3302 that defines the area 2816 inside the frame structure 3302 and around its perimeter. Next to the frame structure 3302 is the lighting element 2814, which is depicted as a rectangular arrangement of linear LED arrays. When installed, the lighting element 2814 will create a continuous line of light around the interior of the sink. Finally, the protective element 2812, which serves as a sealing layer, is shown in FIG. 33 as a rectangular structure that corresponds to the rectangular dimensions of the frame structure 3302 and lighting element 2814.

Figure 34:
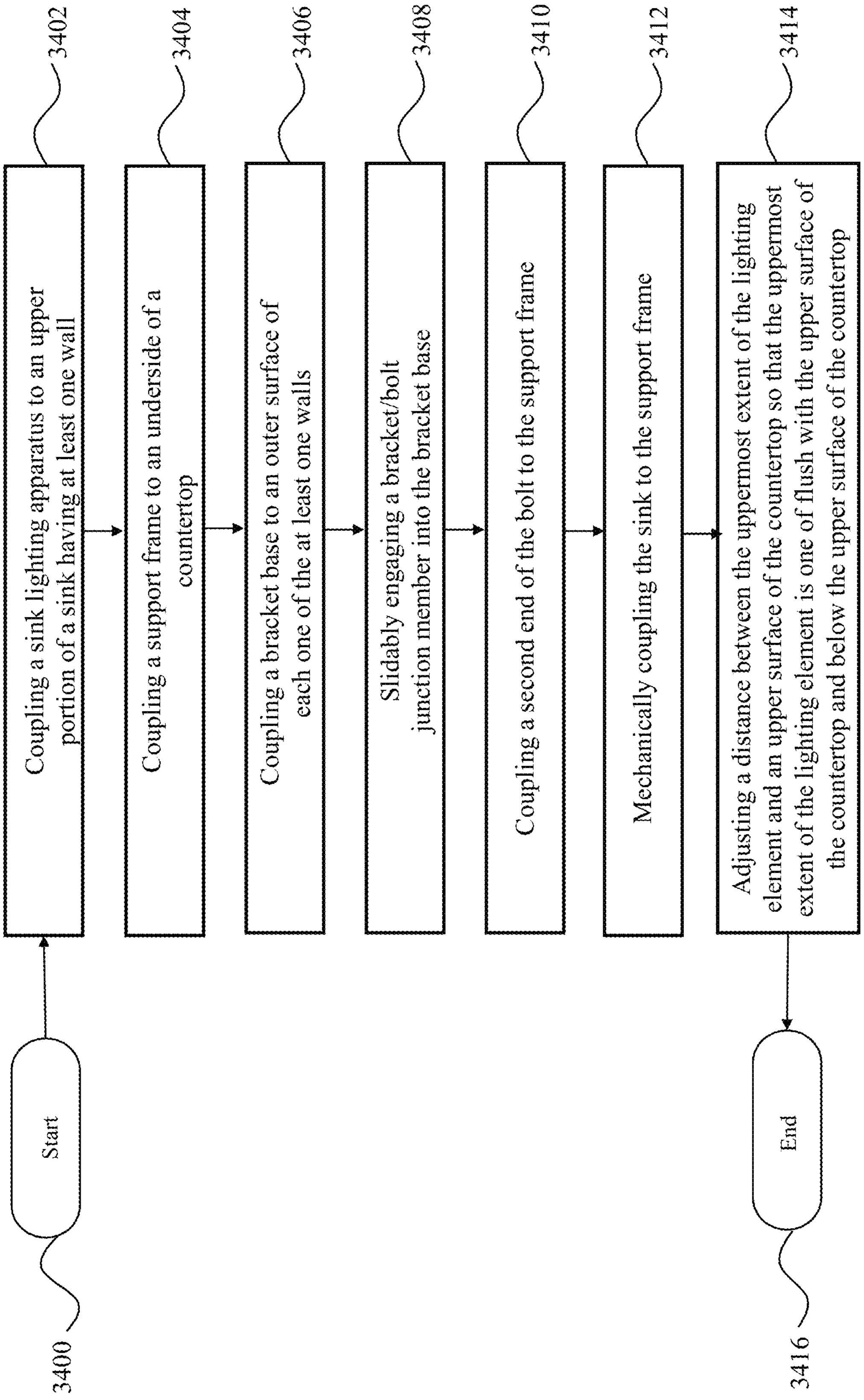
FIG. 34 is flow chart showing an exemplary method of installing a sink lighting assembly according to an example embodiment.
Figure 36:
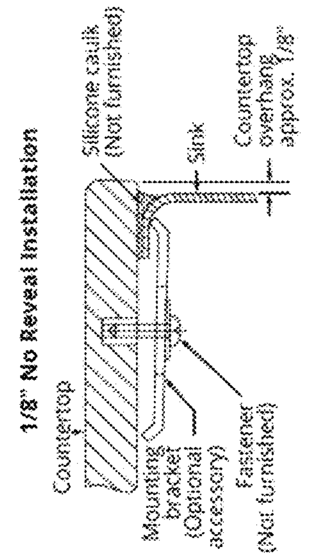
FIG. 36 Prior Art
FIG. 36 is an elevational side cutaway view of a prior-art undermount sink with a sink-wall permitter that is larger than or equal to the permitter of the opening in the countertop.
Figure 35:
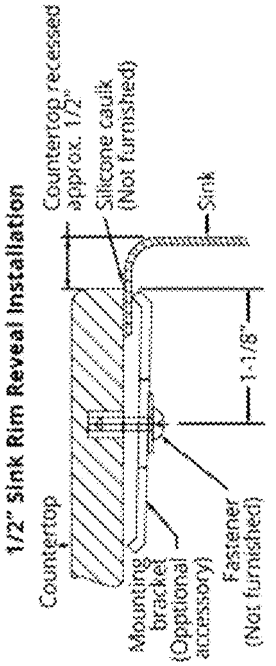
FIG. 35 Prior Art
FIG. 35 is an elevational side cutaway view of a prior-art undermount sink with a sink-wall permitter that is smaller than the perimeter of the opening in the countertop.
Figure 38:
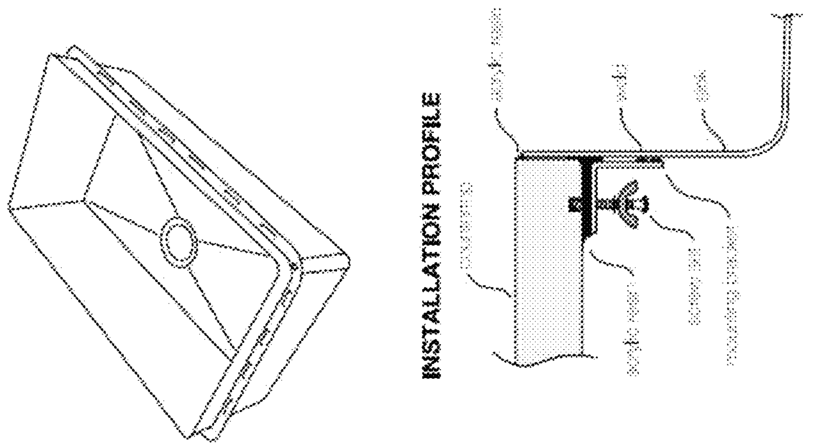
FIG. 38 is an elevational side cutaway view of a flush-mount installation with a fixed flange around the outer walls of the sink.
Figure 37:
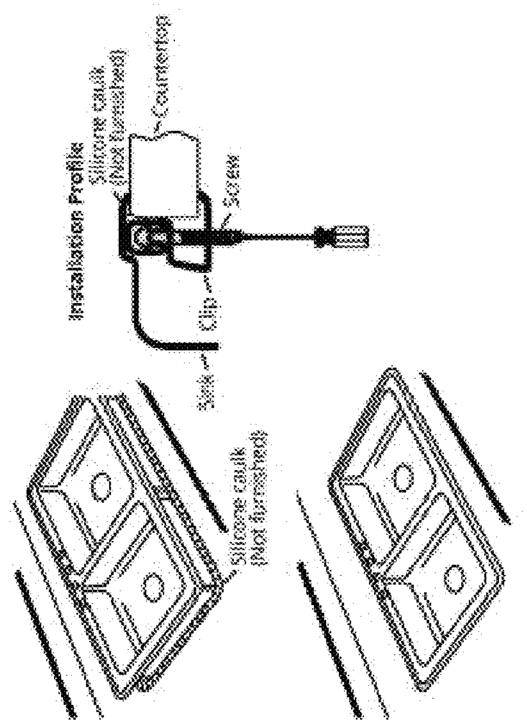
FIG. 37 Prior Art
FIG. 37 is an elevational side cutaway view of a prior-art top-mount sink.

FIG. 34 provides a flow chart that shows a series of steps to install the sink 100, 1200, 2400 and sink lighting assembly 101, 1201, 2401 with a sink installation assembly 1001, 2001, 2401 in conformance with embodiments of the present invention. The process begins at step 3402 where a sink lighting assembly 101, 1201, 2401 is coupled to an upper portion of a sink 100, 1200, 2400. Next, in step 3404, a support frame 1300, 2604 is coupled to and underside of the countertop. Note, step 3404 is not required in a top-mount installation method. In step 3406, at least one bracket base 202, 1602, 2502 is coupled to an outer surface of at least one of the sink walls 106, 1206, 2406. In step 3408, at least one bracket/bolt junction member 404, 1604, 2504 is slidably engaged with the at least one bracket base 202, 1602, 2502. In step 3410, at least one bolt member 502, 1406, 2606 is coupled to the support frame 1300, 2604 by inserting one end of each bolt member 502, 1406, 2606 into an opening in the support frame and positioning the bolt until it aligns with at least one of the bracket/bolt junction members 404, 1604, 2504. 2400

Note, step 3410 is not required in a top-mount installation method. In step 3412, the sink 1200, 2400 is brought into mechanical communication with the support frame by placing a nut on each of the at least one bolt members 502, 1406, 2606. In step 3414, for a flush-mount configuration, at least one downward force bolt 2202 is attached to each of the at least one bracket/bolt junction members 1604 and tightened until the sink lighting assembly 101, 1201, 2401 is secured to the countertop in a manner that resists both upward and downward forces on the sink and sink lighting assembly. The process ends at step 3416.

Figure 40:
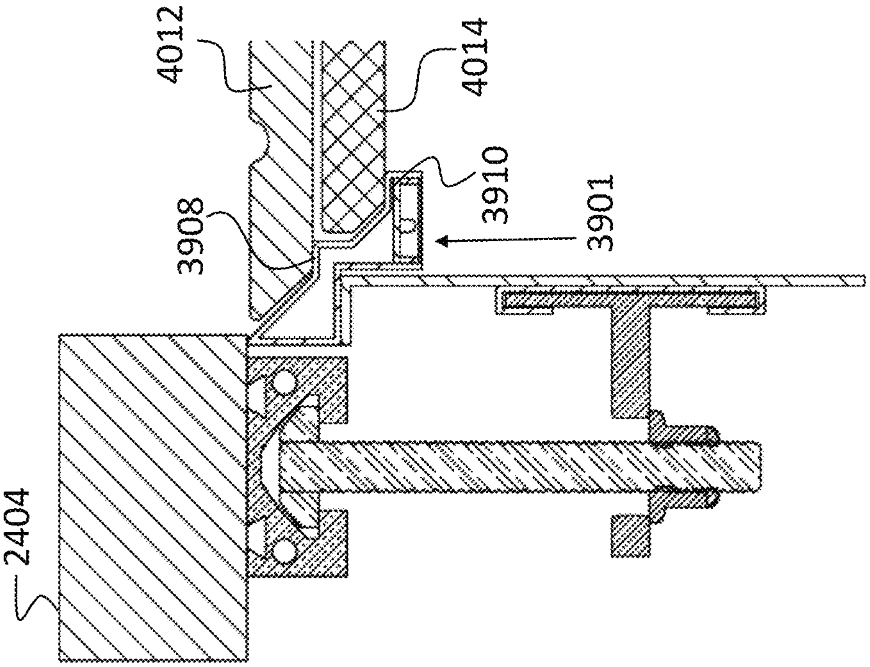
FIG. 40 is an elevational partial cutaway view of an undermount light emitting assembly installation according to an embodiment of the present invention.
Figure 39:
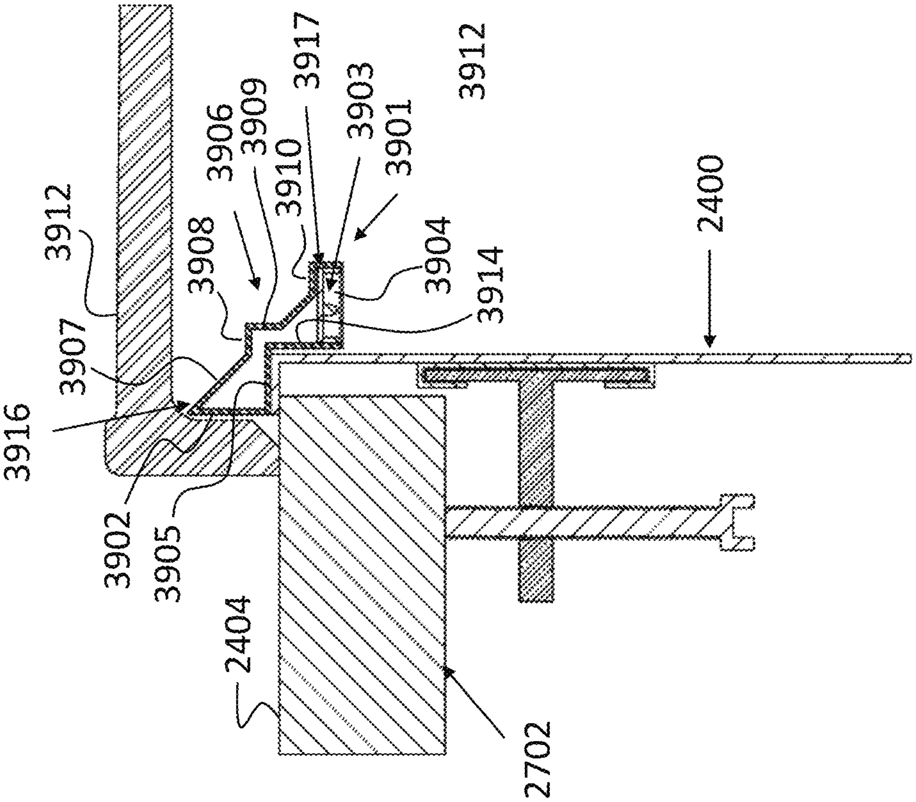
FIG. 39 is an elevational partial cutaway view of a top-mount sink lighting assembly according to an embodiment of the present invention.
Figure 41:
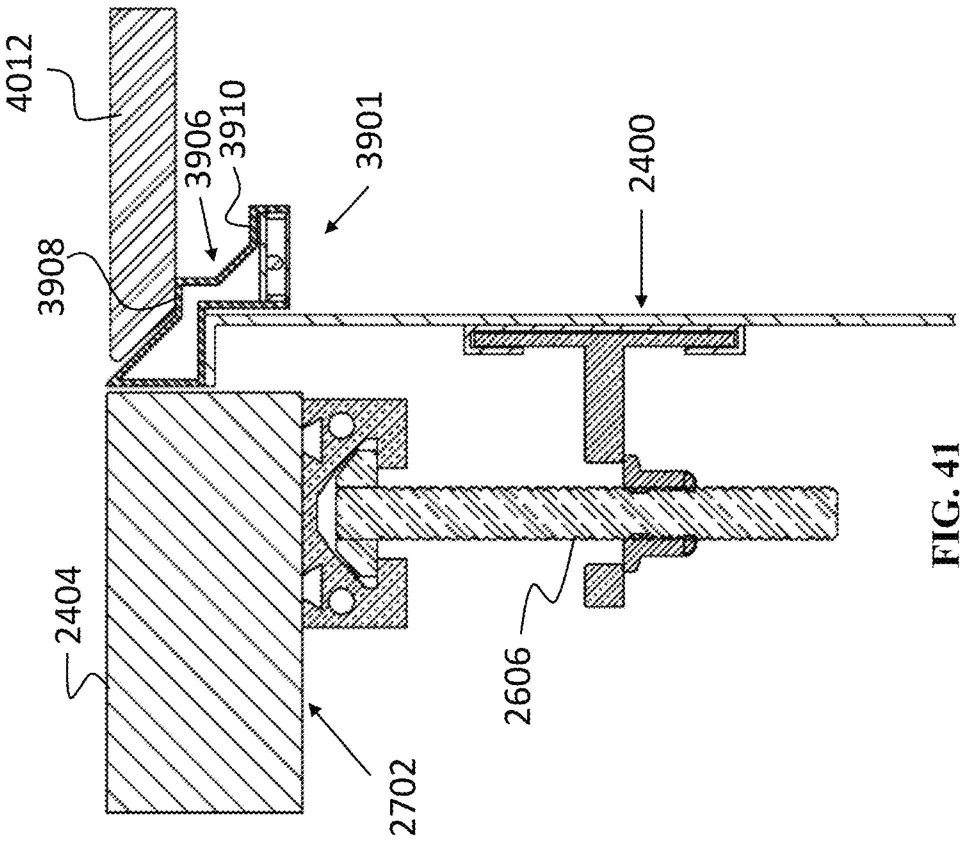
FIG. 41 is an elevational partial cutaway view of a flush mount installation of a light emitting assembly according to an embodiment of the present invention.

The present invention can be enhanced with accessories that provide added functionality to all embodiments of the light-up sink assembly previously described. The accessories can include a cutting board, a knife holder, a dish strainer, a shredder, and many more, that cover the sink lighting assembly 101, 1201, 2401 or fit within the assembly in a secure manner. FIGS. 39-41 illustrate exemplary components that facilitate these accessories. FIG. 39 shows an elevational partial cutaway view of a sink lighting assembly 3901. In the installation configuration shown in FIG. 39, the sink lighting assembly 3901 is coupled to a sink 2400 and mounted on top of the countertop 2404 in a top-mount configuration. Here, the sink lighting assembly 3901 differs from the previously illustrated lighting assemblies in a few notable ways. First, the assembly 3901 has an area 3903 that is holds the light emitting element 3904, e.g., LED strip. This area 3903 is more rectangular that the previously illustrated area 2008 and allows the light emitting element 3904 to sit flush and emit light in a downward direction. Second, the angled front/inner wall 3906 has two steps (horizontal portions), 3908 and 3910. These steps, 3908 and 3910 are separated by a non-horizontal portion 3909 and provide a support surface upon which portions of the accessories can securely sit. These will be shown in FIGS. 40 and 41.

The sink lighting assembly shown in FIG. 39 has an outer wall that includes a first vertical portion 3902, a second vertical portion 3914, and a horizontal portion 3905 coupled between the first 3902 and second 3914 vertical portions. An inner wall has a first end 3916 and an opposing second end 3917. The first end 3916 of the inner wall is coupled to the first vertical portion 3902 of the outer wall. The inner wall 3907 spans from the first vertical portion 3902 towards and past the second vertical portion 3914 of the outer wall. A lighting element 3904 is disposed in an area 3903 located between the second end 3917 of the inner wall and the second vertical portion 3904 of the outer wall.

Referring still to FIG. 39, a cover 3912 is shown resting on the countertop 2404 and also spanning above and covering the illustrated portion of the sink lighting assembly 3901. The cover 3912 spans the entire sink covers the entire light emitting assembly 3901. The cover 3912 can provide numerous features and accessories. For example, it can include a series of slits that can accept the cutting ends of knives and serve as a knife rack. Another embodiment of a cover is shown in FIG. 40. This embodiment includes two sliding panels 4012 and 4014. Each panel 4012, 4014 can feature, for example, a cutting board that would facilitate the cutting of food items above the sink. Conveniently, once the food items are cut, the cover 3912 can be moved, e.g., by opening it in the center by sliding two halves 4012, 4014 away from each other, and the debris from the cut food can be easily dropped into the sink and disposed of. In another embodiment, the cover panels 4012, 4014 can have perforations and serve as a dish drying rack. Conveniently, the cover 4012, 4014 can be made into halves so that either half can be slid to the side in order to grant access to the sink. In the embodiment where the cover 4012 is a rack for drying dishes, the dishes can continue to dry even when the cover half is pushed over the countertop 2404. Of course, when the cover 4012 is over the sink, the water from the drying dishes conveniently falls into the sink.

FIG. 40 provides an elevational partial cutaway view of an undermount light emitting assembly installation 3901. In this embodiment, the upper edge of the emitting assembly 3901 makes contact with a bottom surface of the countertop 2404. The assembly 3901 features the two steps 3908 and 3910 shown in FIG. 39. In this view, two accessory elements 4012 and 4014 can be seen seated in steps 3908 and 3910, respectively. The elements 4012 and 4014 can span the entire opening of the sink or can be smaller than the entire opening of the sink. The elements 4012 and 4014 can be used jointly or separately, depending on the preference of the user. For example, element 4012 could be a cutting board and element 4014 could be a drying rack for dishes. If each of the elements has a bit less than half of the entire sink with, there could still be an opening between them that would allow the user to place liquids and foods into the sink to dispose of them. The elements 4012 and 4014 can also be removed as needed by the user. Advantageously, the steps 3908 and 3910 allow the elements to seek firmly and securely and to slide as desired by the user.

FIG. 41 provides an elevational partial cutaway view of a flush mount installation of the light emitting assembly 3901. In this embodiment, the upper edge of the light-emitting assembly 3901 is substantially coplanar with the upper surface of the countertop 2404. The accessory element 4012 is seen seated in the upper seat 3908, similar to what was shown in FIG. 40.

Figure 42:
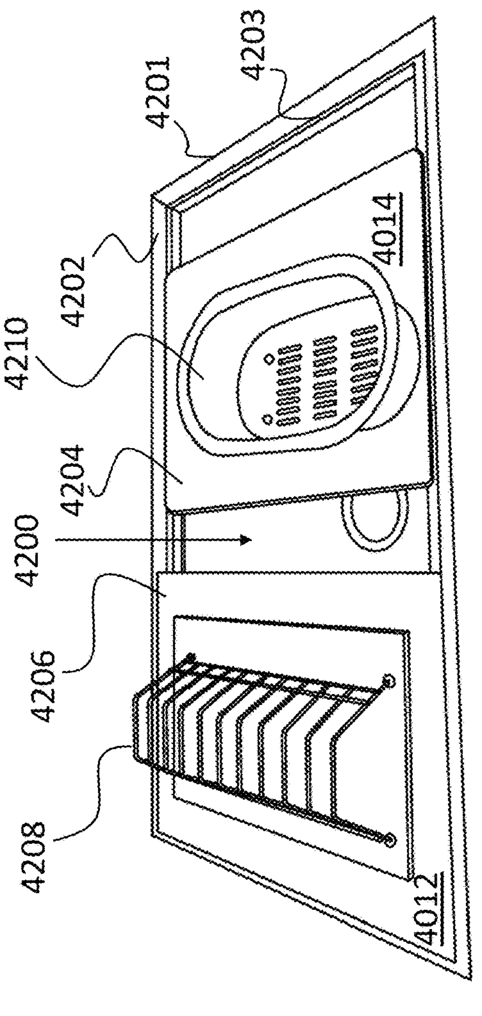
FIG. 42 is a partial elevational downward-looking view of the sink with a lighting installation supporting two accessories that slide along an upper edge of the lighting assembly according to an embodiment of the present invention.

FIG. 42 shows a partial perspective downward-looking view at the top of a sink frame 4202 that is built with an approximately 45-degree angle from its upper edge 4201 down to a step 4203 that is approximately horizontal and parallel to the countertop. In the step 4203 rides an accessory 4204, which, in this illustrated example, is a strainer 4210. Strainer 4210 can be, for example for drying washed lettuce of other vegetables. The accessory 4204 can slide back and forth along the step 4203 to allow a user to gain access to any part of the sink or to simply align the strainer 4210 with any desired part of the sink 4200. A second accessory 4208 can also be supported by and ride within the frame 4202. The second accessory can ride within a second step (not shown) or ride along the angled portion of the frame, as illustrated. If the base 4012 of the second accessory 4206 is larger than the base 4014 of the first accessory 4204, the second accessory can pass above the first accessory 4204 so that the two can align with one another or they can change locations along the frame 4202.

Figure 43:
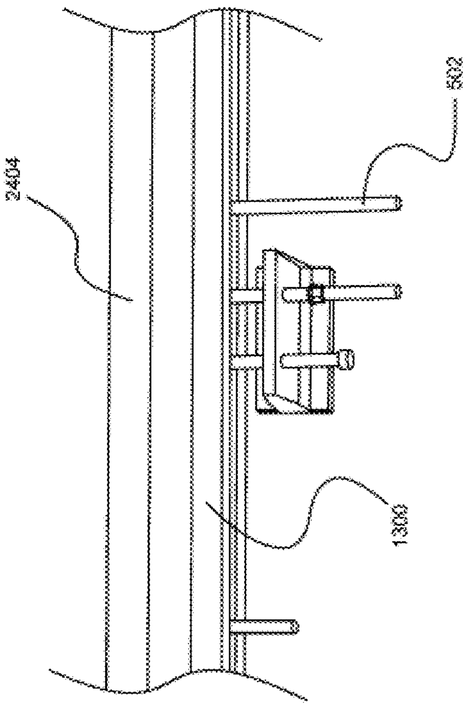
FIG. 43 is a perspective view of a support frame installed under a countertop and bolt members extending therefrom.

FIG. 43 illustrates an additional use of support frame 1300. When desired, a user can install an additional set of bolt members 502 into the channel of the support frame 1300. One such bolt member 502 is shown in FIG. 43 with its head locked into the channel of the support frame 1300 and its threaded end extending downwardly away from the countertop 2404. The threaded ends of the bolt members 502 provide numerous additional utilities for the user. For example, a user can hang a shelf underneath the sink using the threaded ends of the bolt members and a set of nuts, not illustrated, to secure the shelf to the bolt members 502. The bolt members 502 can be provided in any length desired by the user or the application.

The claims appended hereto are meant to cover all modifications and changes within the scope and spirit of the present invention.

What is claimed is:

1. A sink assembly that allows mounting of a sink in each of a top mount, flush mount, and an under-mount configuration at a sink opening of a countertop, comprising:

a sink having at least one wall having a top, an interior surface, an exterior surface, and an upper lip portion formed at the top of the at least one wall which extends outward from the sink;

a plurality of bracket/bolt junction members;

a plurality of brackets coupled to the exterior surface of the at least one wall of the sink, each bracket of the plurality of brackets configured to receive and hold a respective one of the plurality of bracket/bolt junction members from moving toward the top of the sink and hold the respective bracket/bolt junction member from moving away from the top of the sink, wherein each bracket of the plurality of brackets extends outward from the exterior surface of the at least one wall of the sink; and wherein the upper lip portion of the sink extends outward farther than each of the brackets of the plurality of brackets, and wherein each of the bracket/bolt junction members have a bracket wall which, when the bracket/bolt junction member is engaged and held by its respective bracket, extends outward in a direction away from the sink and includes at least one hole through the bracket wall to receive a bolt that interacts with an underside of the countertop.

2. The sink assembly of claim 1, further comprising a top frame having:

a first wall coupled to the interior surface of the at least one wall of the sink at the top of the at least one wall;

a second wall coupled to an upper surface of the upper lip portion;

a third wall that extends from a top of the top frame downward and having a lower portion that is spaced away from the first wall such that there is a space between the first wall and the lower portion of the third wall; and a fourth wall that that extends upward from an outermost portion of the second to the top of the top frame.

3. The sink assembly of claim 2, further comprising a lighting element disposed in the space between the lower portion of the third wall and the first wall.

4. The sink assembly of claim 2, wherein the third wall is at an angle that is neither parallel nor perpendicular to either the first wall or the second wall.

5. The sink assembly of claim 4, wherein the second wall extends from a top of the first wall, and the third wall is joined to the first wall and the second wall at the top of the first wall.

6. The sink assembly of claim 2, wherein the third wall comprises at least one step.

7. The sink assembly of claim 1, where each bracket of the plurality of brackets comprises an upper channel along a top of the bracket and a lower channel along a bottom of the bracket.

8. The sink assembly of claim 7, wherein the upper and lower channels are U-shaped.

9. The sink assembly of claim 1, wherein each of the plurality of bracket/bolt junction members are each configured to slide into engagement with and be held by a respective one of the plurality of brackets in a horizontal direction, and wherein there the at least one hole includes a non-threaded hole through the bracket wall and a threaded hole through the bracket wall.

10. The sink assembly of claim 9, further including an attachment bolt threadably engaged in the threaded hole.

11. The sink assembly of claim 9, further comprising:

a plurality of retaining bolts, each retaining bolt having a head, and a shaft extending from the head;

a support frame that is configured to be mounted at an underside of the countertop around the sink opening, the frame having a bolt head opening at an underside of the frame sized to receive the head of a retaining bolt, and a slot extending from the bolt head opening that is narrower than the head of the retaining bolt and wider than the shaft of the retaining bolt;

wherein each of the plurality of retaining bolts are disposed in the slot of the support frame in correspondence with a respective one of the plurality of bracket/bolt junction members, and wherein the shaft of each retaining bolt passes through the unthreaded hole of its respective bracket/bolt junction member; and a plurality of retaining nuts, each one of the plurality of retaining nuts threadably disposed on the shaft of a respective one of the plurality of retaining bolts under the bracket wall of the respective bracket/bolt junction member.

12. A sink assembly including a sink that allows mounting of the sink at a sink opening of a countertop in each of a top mount, flush mount, and an under-mount, the sink assembly comprising:

the sink having at least one wall having a top, an interior surface, an exterior surface, and an upper lip portion formed at the top of the at least one wall which extends outward from the sink;

a plurality of brackets coupled to the exterior surface of the at least one wall of the sink, each bracket of the plurality of brackets configured to slidably receive and hold a respective bracket/bolt junction member, wherein each bracket of the plurality of brackets extends outward from the exterior surface of the at least one wall of the sink;

wherein the upper lip portion of the sink extends outward farther than each of the brackets of the plurality of brackets; and a top frame having:

a first wall coupled to the interior surface of the at least one wall of the sink at the top of the at least one wall;

a second wall coupled to an upper surface of the upper lip portion;

a third wall that extends from a top of the top frame downward and having a lower portion that is spaced away from the first wall such that there is a space between the first wall and the lower portion of the third wall;

a fourth wall that that extends upward from an outermost portion of the second to the top of the top frame; and a lighting element disposed in the space between the lower portion of the third wall and the first wall.

13. The sink assembly of claim 12, wherein the third wall is at an angle that is neither parallel nor perpendicular to either the first wall or the second wall.

14. The sink assembly of claim 13, wherein the second wall extends from a top of the first wall, and the third wall is joined to the first wall and the second wall at the top of the first wall.

15. The sink assembly of claim 12, where each bracket of the plurality of brackets comprises an upper channel along a top of the bracket and a lower channel along a bottom of the bracket.

16. The sink assembly of claim 15, wherein the upper and lower channels are U-shaped.

17. The sink assembly of claim 12, further comprising a plurality of bracket/bolt junction members which are each configured to slide into engagement with and be held by a respective one of the plurality of brackets, and each of the bracket/bolt junction members having a bracket wall which, when the bracket/bolt junction member is engaged and held by its respective bracket, extends outward in a direction away from the sink and includes a non-threaded hole through the bracket wall and a threaded hole through the bracket wall.

18. The sink assembly of claim 17, further including an attachment bolt threadably engaged in the threaded hole.

19. The sink assembly of claim 18, further comprising:

a plurality of retaining bolts, each retaining bolt having a head, and a shaft extending from the head;

a support frame that is configured to be mounted at an underside of the countertop around the sink opening, the frame having a bolt head opening at an underside of the frame sized to receive the head of a retaining bolt, and a slot extending from the bolt head opening that is narrower than the head of the retaining bolt and wider than the shaft of the retaining bolt;

wherein each of the plurality of retaining bolts are disposed in the slot of the support frame in correspondence with a respective one of the plurality of bracket/bolt junction members, and wherein the shaft of each retaining bolt passes through the unthreaded hole of its respective bracket/bolt junction member; and a plurality of retaining nuts, each one of the plurality of retaining nuts threadably disposed on the shaft of a respective one of the plurality of retaining bolts under the bracket wall of the respective bracket/bolt junction member.

20. The sink assembly of claim 12, wherein the third wall of the top frame comprises at least one step.

21. A sink assembly that allows mounting of a sink in each of a top mount, flush mount, and an under-mount configuration at a sink opening of a countertop, comprising:

a sink having at least one wall having a top, an interior surface, an exterior surface, and an upper lip portion formed at the top of the at least one wall which extends outward from the sink;

a plurality of brackets coupled to the exterior surface of the at least one wall of the sink, each bracket of the plurality of brackets configured to slidably receive, in a horizontal direction relative to the sink such that the sink is universally mountable in any of the top mount, flush mount, and under-mount configurations, and hold a respective one of a plurality of bracket/bolt junction members from moving toward the top of the sink and to hold the respective bracket bolt junction member from moving away from the top of the sink, wherein each bracket of the plurality of brackets extends outward from the exterior surface of the at least one wall of the sink; and wherein the upper lip portion of the sink extends outward farther than each of the brackets of the plurality of brackets.

* * * * *